(12) United States Patent
Hamada

(10) Patent No.: US 12,438,994 B2
(45) Date of Patent: Oct. 7, 2025

(54) IMAGE READING APPARATUS CAUSED TO READ A HOLDING MEMBER PLACED ON A READING AREA, THE HOLDING MEMBER HOLDING RECEIPTS AND EXTRACTING EDGES OF THE RECEIPTS FROM A SINGLE READ IMAGE

(71) Applicant: CANON KABUSHIKI KAISHA, Tokyo (JP)

(72) Inventor: Kaoru Hamada, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/649,792

(22) Filed: Apr. 29, 2024

(65) Prior Publication Data

US 2024/0283886 A1    Aug. 22, 2024

Related U.S. Application Data

(63) Continuation of application No. 18/060,788, filed on Dec. 1, 2022, now Pat. No. 12,003,684.

(30) Foreign Application Priority Data

Dec. 8, 2021  (JP) ................................. 2021-199624

(51) Int. Cl.
    *H04N 1/387*   (2006.01)
    *H04N 1/00*    (2006.01)
    (Continued)

(52) U.S. Cl.
    CPC ....... *H04N 1/3873* (2013.01); *H04N 1/00748* (2013.01); *H04N 1/00822* (2013.01); *H04N 1/02815* (2013.01); *H04N 1/1061* (2013.01)

(58) Field of Classification Search
    CPC .......... H04N 1/00702; H04N 1/00708; H04N 1/00737; H04N 1/00748; H04N 1/00816;
    (Continued)

(56) References Cited

U.S. PATENT DOCUMENTS 6,310,984 B2 * 10/2001 Sansom-Wai .......... G06V 10/24
                                                           382/173
2018/0152594 A1 * 5/2018 Fukunaga ............ H04N 1/3878
(Continued)

FOREIGN PATENT DOCUMENTS

JP    2003162017 A  *  6/2003  ................ B41L 1/22
JP    2003338920 A  *  11/2003
(Continued)

*Primary Examiner* — Chad Dickerson
(74) *Attorney, Agent, or Firm* — Canon U.S.A., Inc. IP Division

(57) ABSTRACT

An image reading apparatus includes a transparent member having a placement surface on which a document is to be placed, a reading unit configured to read an image of the document placed on the transparent member via the transparent member, and a reading mode in which an image of a document, placed in a holding member with a transparent portion, is read. The document to be read is placed in the holding member so as to be visible via the transparent portion and the holding member is placed on the placement surface with the transparent portion of the holding member in contact with the placement surface. A processor detects an edge in an image acquired by the reading unit in the reading mode, and to extract an image surrounded by an edge detected in an area surrounded by an edge corresponding to the holding member in the reading mode.

10 Claims, 18 Drawing Sheets

(51) Int. Cl.
*H04N 1/028* (2006.01)
*H04N 1/10* (2006.01)

(58) Field of Classification Search
CPC ........... H04N 1/00822; H04N 1/02815; H04N 1/1061; H04N 1/3873
USPC ................................. 358/1.1, 1.2, 1.11–1.18
See application file for complete search history.

(56) References Cited

U.S. PATENT DOCUMENTS

2019/0098170 A1\* 3/2019 Kodimer .................. H04N 1/38
2022/0311891 A1\* 9/2022 Yokogawa ............... H04N 1/04

FOREIGN PATENT DOCUMENTS

JP 2010041397 A \* 2/2010
JP 2018085676 A \* 5/2018 ......... G06K 9/00442

\* cited by examiner

FIG.5A
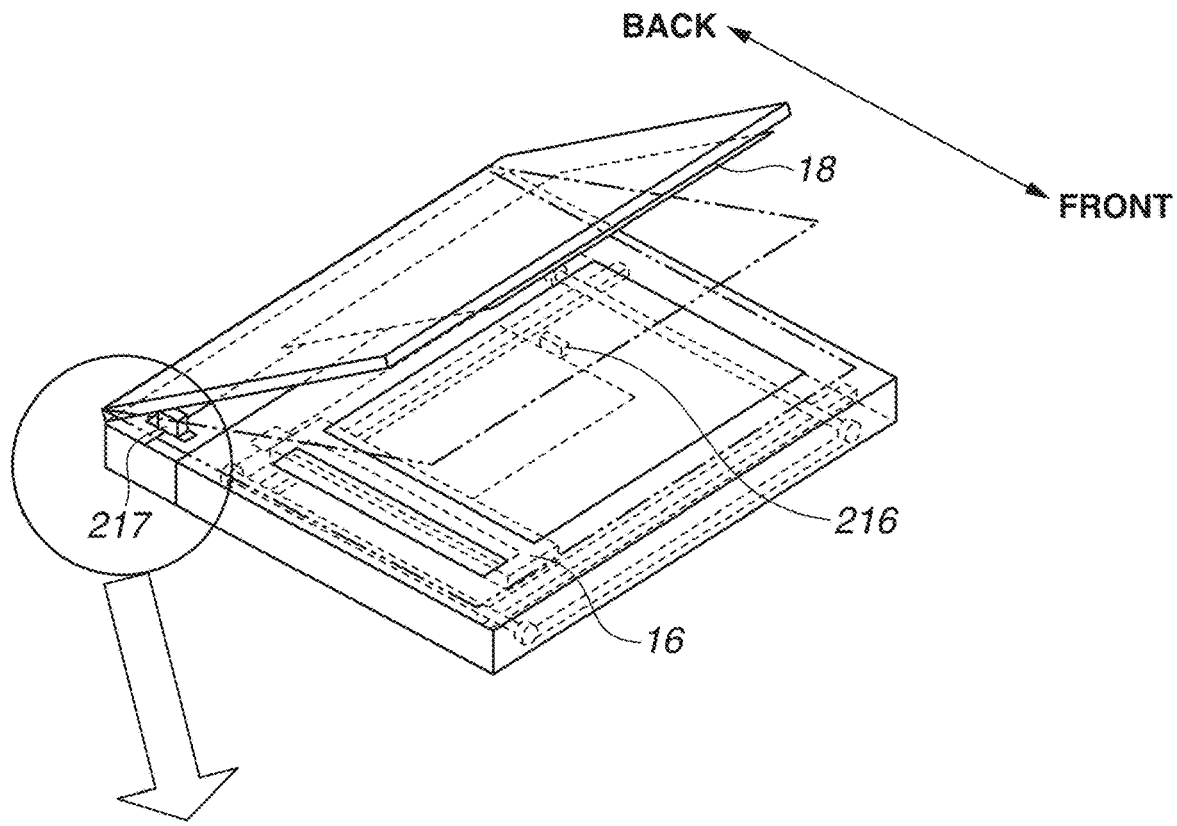
FIG.5B-1  FIG.5B-2  FIG.5B-3
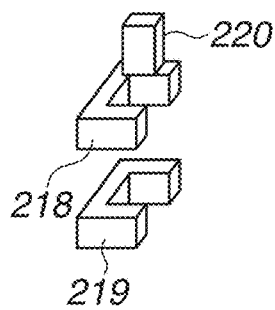 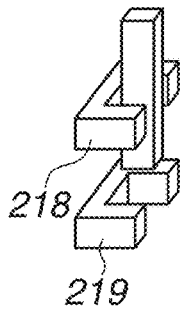 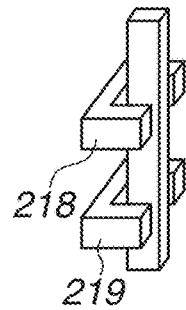
FIG.5C
| ANGLE OF PRESSING PLATE 18 | PHOTOSENSOR 218 | PHOTOSENSOR 219 | STATE OF PRESSING PLATE 18 |
|---|---|---|---|
| $\theta > 25$ | OFF | OFF | OPEN |
| $5 < \theta \leq 25$ | ON | OFF | PARTLY CLOSED |
| $0 \leq \theta \leq 5$ | ON | ON | CLOSED |

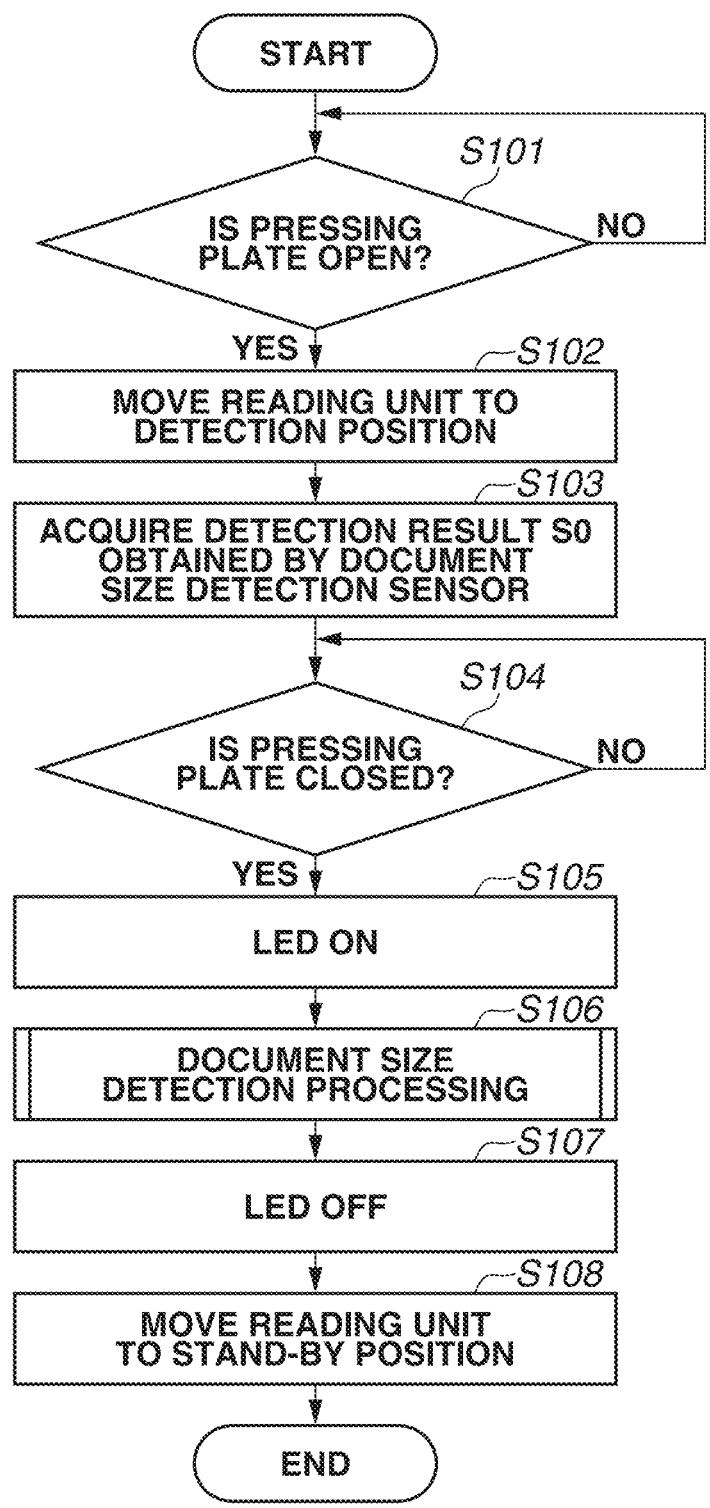

FIG.8

| DISTANCE FROM SECOND ABUTTING PORTION TO MAIN SCANNING END PORTION [mm] | DETECTION SIZE | |
|---|---|---|
| | S0 ≠ S1 | S0 = S1 |
| 30 – 50 | MINIMUM SIZE | — |
| 50 – 126.7 | SMALL SIZE | — |
| 126.7 – 146 | STMTR | — |
| 146 – 169 | A5R | — |
| 169 – 197 | B6 | B5R |
| 197 – 214.5 | A5 | A4R |
| 214.5 – 244 | STMT | LTRR |
| 244 – 266.4 | B5 | B4R |
| 266.4 – 284 | LTR | LDRR |
| 284 – 302 | A4 | A3R |

IMAGE READING APPARATUS CAUSED TO READ A HOLDING MEMBER PLACED ON A READING AREA, THE HOLDING MEMBER HOLDING RECEIPTS AND EXTRACTING EDGES OF THE RECEIPTS FROM A SINGLE READ IMAGE

CROSS-REFERENCE TO RELATED APPLICATION

This application is a Continuation of U.S. application Ser. No. 18/060,788, filed Dec. 1, 2022, which claims priority to Japanese Patent Application No. 2021-199624, filed Dec. 8, 2021, each of which is hereby incorporated by reference herein in their entirety.

BACKGROUND

Field of the Disclosure

The present disclosure relates to an image reading apparatus that cuts out images of a plurality of documents from an image including the plurality of documents.

Description of the Related Art

Some typically known image reading apparatuses perform processing of reading images of a plurality of documents placed on a document positioning glass plate, detecting edges of the plurality documents from an image including the images of the plurality of documents, and cutting out the images of the plurality of documents based on the edges (Japanese Patent Application Laid-Open No. 2002-10059). FIG. 18A is a diagram illustrating a read image in a case where images of three documents placed on a document positioning glass plate have been read. FIG. 18B illustrates images having been subjected to the processing discussed in Japanese Patent Application Laid-Open No. 2002-10059 on the read image. Performing of the processing discussed in Japanese Patent Application Laid-Open No. 2002-10059 outputs images of documents in a state where each image is cut out as illustrated in FIG. 18B.

In recent years, there has been increased opportunities to digitize sales slips, such as receipts. For example, a plurality of receipts is digitized by reading the plurality of receipts placed on a document positioning glass plate and performing the processing discussed in Japanese Patent Application Laid-Open No. 2002-10059. A receipt is likely to be curved (curled) because it is a document made of a roll of paper on which an image is formed. Thus, it takes time and effort to place a plurality of curved documents on a document positioning glass plate. Placing the plurality of documents on the document positioning glass plate one by one also requires time and effort.

Thus, as illustrated in FIG. 18C, placing a transparent document folder that holds a plurality of documents, such as receipts, on the document positioning glass plate and reading the documents in the transparent document folder may be considered. However, the following issue arises when the transparent document folder holding the plurality of documents, such as receipts, is used to read the documents and the processing discussed in Japanese Patent Application Laid-Open No. 2002-10059 is performed on the read image. Specifically, as illustrated in FIG. 18D, an image is cut out based on the edge of the transparent document folder, so that images of documents A, B, and C are output as a single image. In other words, typical image reading apparatuses cannot cut out individual images of documents from an image including the images of the documents read by using the transparent document folder. Thus, with the typical image reading apparatuses, a plurality of documents is to be placed on the document positioning glass plate one by one without using the transparent document folder in order to cut out the individual images of the documents from an image including the images of the document.

SUMMARY

In consideration of the above-described issue, the present disclosure generally relates to an image reading apparatus capable of easily cutting out individual images of documents from an image that includes the images of the documents.

According to an aspect of the present disclosure, an image reading apparatus includes a transparent member having a placement surface on which a document is to be placed, a reading unit configured to read an image of the document placed on the transparent member via the transparent member; and at least one processor configured to detect an edge in an image acquired by the reading unit in a reading mode, and extract an image surrounded by an edge, detected in an area surrounded by an edge corresponding to a holding member, in the reading mode. The holding member has a transparent portion and the document to be read is placed in the holding member so as to be visible via the transparent portion, and the holding member is placed on the placement surface with the transparent portion of the holding member in contact with the placement surface.

Further features of the present disclosure will become apparent from the following description of exemplary embodiments with reference to the attached drawings.

BRIEF DESCRIPTION OF THE DRAWINGS

FIGS. 5A to 5C are diagrams illustrating a configuration for detecting an angle of a pressing plate with respect to the reading apparatus with an opening-closing detection sensor.

FIG. 6 is a flowchart illustrating a method for determining a size of a document placed on a document positioning glass plate.

FIG. 8 is a table illustrating a method for detecting a document size.

DESCRIPTION OF THE EMBODIMENTS

Hereinafter, exemplary embodiments according to the present disclosure will be described with reference to the accompanying drawings. Shapes and relative positions of constituent elements described in the exemplary embodiments should be changed as appropriate depending on a configuration and various conditions of an apparatus to which the present disclosure is applied, and the scope of the present disclosure is not limited to the below-described exemplary embodiments.

[Image Forming Apparatus]

Figure 1:
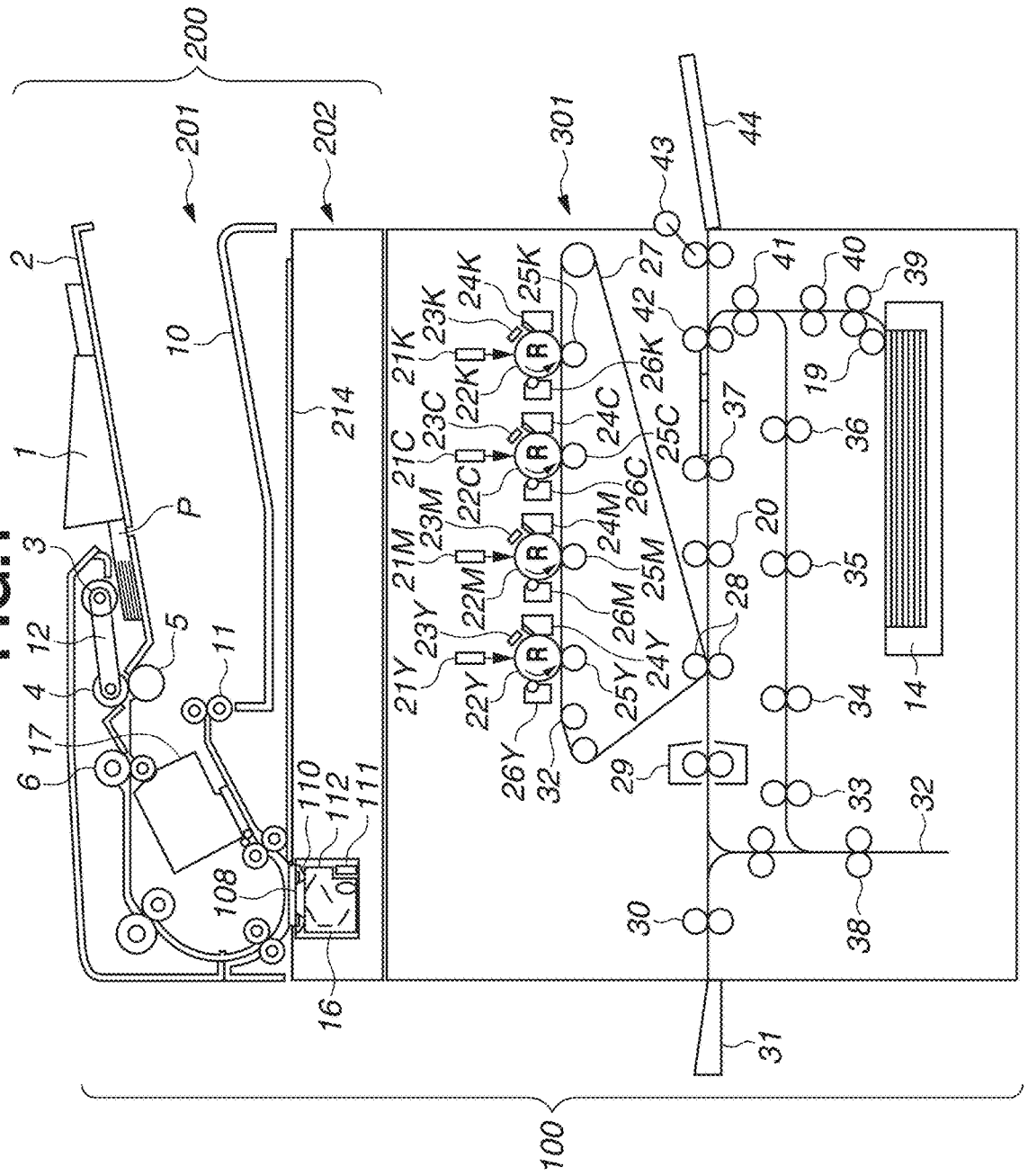
FIG. 1 is a diagram illustrating a configuration of an image forming apparatus.

A first exemplary embodiment of the present disclosure will be described below. FIG. 1 is a sectional diagram illustrating a configuration of an electrophotographic color copying machine (hereinafter, referred to as image forming apparatus) 100 employed in the present exemplary embodiment. The image forming apparatus 100 is not limited to a copying machine, and may be a facsimile apparatus, a printing apparatus, or a printer. A recording method is not limited to the electrophotographic recording method, and may be an ink jet recording method. Further, the image forming apparatus 100 may form an image in either a monochromatic format or a color format.

Hereinafter, a configuration and a function of the image forming apparatus 100 will be described with reference to FIG. 1. As illustrated in FIG. 1, the image forming apparatus 100 includes a document reading apparatus 200 including a document feeding apparatus 201 and a reading apparatus 202 and an image printing apparatus 301.

<Document Reading Apparatus>

Documents P stacked on a document stacking portion 2 of the document feeding apparatus 201 are fed by a pick-up roller 3 one by one, and further conveyed downstream by a feeding roller 4. A separation roller 5 in pressure contact with the feeding roller 4 is disposed at a position facing the feeding roller 4. The separation roller 5 rotates when a load torque greater than or equal to a predetermined torque is applied thereto, and has a function of separating two documents fed in an overlapping state.

The pick-up roller 3 and the feeding roller 4 are coupled to each other with a swinging arm 12. The swinging arm 12 is supported by a rotating shaft of the feeding roller 4 to be rotatable about the rotating shaft.

Each of the documents P is conveyed by the feeding roller 4 and discharged to a discharge tray 10 by discharge rollers 11.

A reading unit 16 for reading an image of a first face of a conveyed document is disposed on the reading apparatus 202. The reading unit 16 includes a light-emitting diode (LED) 110, an image sensor 111, and a group of optical components 112. The image sensor 111 includes a plurality of light receiving elements for receiving light of red (R), green (G), and blue (B), disposed in a main scanning direction, which is a direction corresponding to a width direction orthogonal to a conveyance direction in which the document is conveyed. The reading unit 16 reads an image of a surface (first surface) of a document as follows. The LED 110 serving as a light source emits light to irradiate the surface of the document with light via a reading glass 108. The group of optical components 112 receives light reflected on the document via the reading glass 108, and guides the light to the image sensor 111. The image sensor 111 outputs analog image data based on the received light. The image sensor 111 simultaneously reads an image corresponding to one line in the main scanning direction. Thus, the image sensor 111 can output image data including data of the entire document by reading an image corresponding to one line for a plurality of times while the document is being conveyed.

A reading unit 17 for reading an image of a second face of the conveyed document is disposed on the document feeding apparatus 201. A configuration of the reading unit 17 is similar to that of the reading unit 16, so that descriptions thereof are omitted.

A document is read thereby as described above.

Reading methods of documents include a document-feeding-reading method and a pressing plate reading method. In the document-feeding-reading method, an image of a conveyed document is read through the above-described method. In the pressing plate reading method, an image of a document placed on a document positioning glass plate 214 of the reading apparatus 202 is read by the reading unit 16 which is moved at a certain speed in the sub-scanning direction (i.e., a rightward direction in FIG. 1) corresponding to the conveyance direction in which the document is conveyed. Typically, images of documents in sheet form are read with the document-feeding-reading method, and images of bound documents, such as a book and a booklet, are read with the pressing plate reading method.

Figure 2:
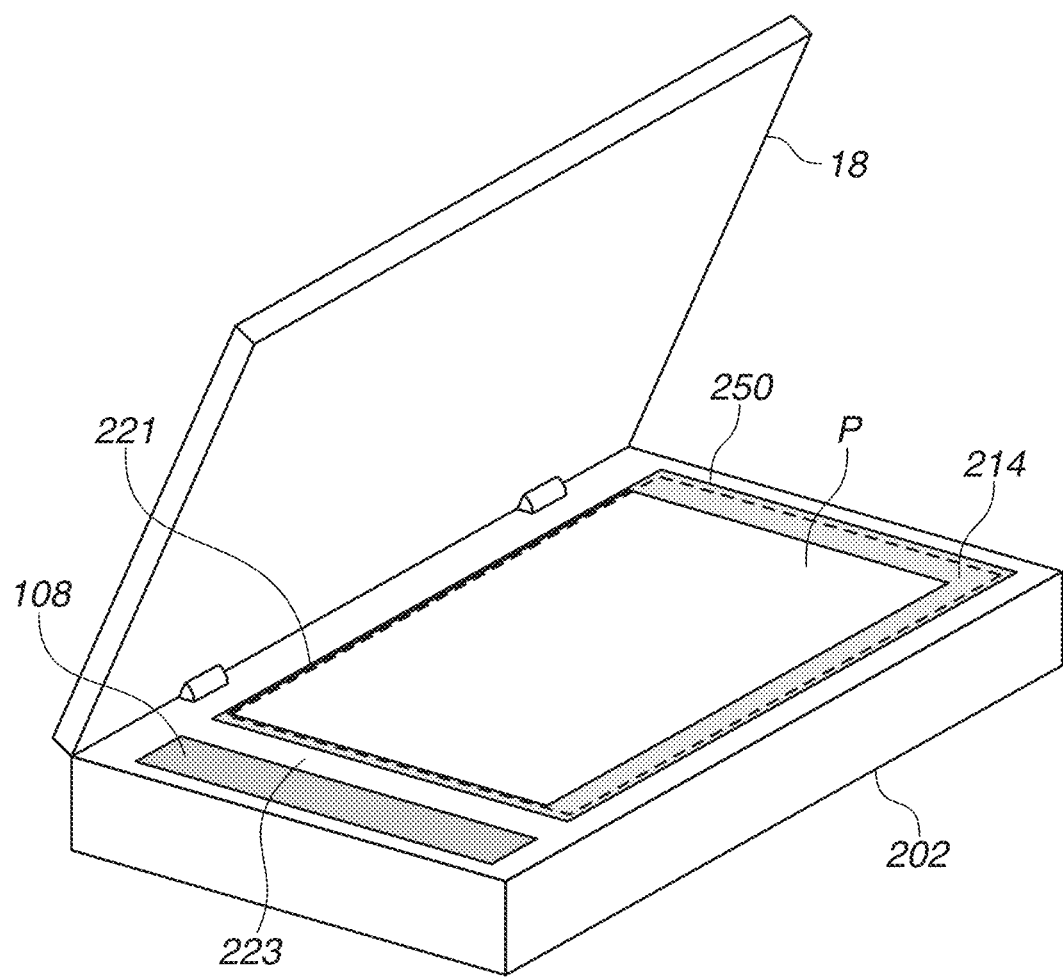
FIG. 2 is a perspective diagram illustrating a configuration of a document reading apparatus.

FIG. 2 is a perspective diagram illustrating a configuration of the document reading apparatus 200. In FIG. 2, illustration of the document feeding apparatus 201 is omitted.

The document feeding apparatus 201 is pivotable with respect to the reading apparatus 202 between the opening position at which the document positioning glass plate 214 is exposed and the closed position at which the document positioning glass plate 214 is covered by the pressing plate 18. The document feeding apparatus 201 includes the pressing plate 18 configured to press the document placed on the document positioning glass plate 214 toward the document positioning glass plate 214 at the closed position.

Figure 3:
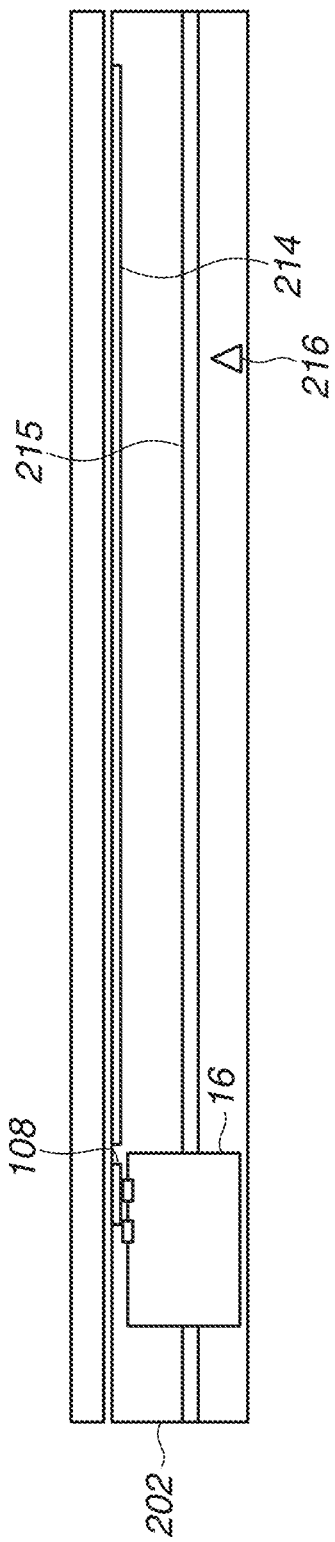
FIG. 3 is a perspective diagram illustrating a configuration of a reading apparatus.

FIG. 3 is a sectional diagram illustrating a configuration of the reading apparatus 202. The reading apparatus 202 includes a reading glass 108, a document positioning glass plate 214, a reading unit 16, a reading guide 215, a motor 222 for moving the reading unit 16 in the sub-scanning direction orthogonal to the main scanning direction, a document size detection sensor 216, and an opening-closing detection sensor 217.

The motor 222 moves the reading unit 16 in the sub-scanning direction (from the left to right in FIG. 3) and the reading unit 16 reads a document placed on the document positioning glass plate 214 with the pressing plate reading method. The reading unit 16 is guided by the reading guide 215 to be moved in the sub-scanning direction.

A size of the document placed on the document positioning glass plate 214 is determined based on a reading result obtained by the reading unit 16 and a detection result obtained by the document size detection sensor 216. More specifically, a length in the main scanning direction of the document placed on the document positioning glass plate 214 is determined based on the reading result obtained by the reading unit 16, and a length in the sub-scanning direction of the document placed on the document positioning glass plate 214 is determined based on the detection result obtained by the document size detection sensor 216. For example, a known sensor including a light emitting portion and a light receiving portion may be used as the document size detection sensor 216.

<Image Printing Apparatus>

A sheet storage tray 14 for storing a recording medium is disposed inside the image printing apparatus 301. The recording medium is a material on which an image is to be formed by the image forming apparatus 100. Examples of the recording medium include a sheet of paper, a resin sheet, a fabric, an overhead projector (OHP) sheet, and a label.

A recording medium stored in the sheet storage tray 14 is fed by a pick-up roller 19, and conveyed to registration rollers 20 by, for example, conveyance rollers 39, 40, 41, and 42.

The image printing apparatus 301 further includes a manual sheet feeding tray 44 for stacking recording media. A recording medium stacked on the manual sheet feeding tray 44 is fed by pick-up rollers 43 and conveyed to the registration rollers 20 by, for example, the conveyance rollers 42.

A leading end of a recording medium conveyed by pre-registration rollers 37 comes into contact with the registration rollers 20. As a result, a loop is formed on the recording medium at a position between the registration rollers 20 and the pre-registration rollers 37, so that skew of the recording medium is corrected (reduced).

Image signals output from the document reading apparatus 200 are individually input, by color component basis, to optical scanning devices 21Y, 21M, 21C, and 21K including semiconductor lasers and polygon mirrors. More specifically, an image signal relating to a yellow color component output from the document reading apparatus 200 is input to the optical scanning device 21Y, and an image signal relating to a magenta color component output from the document reading apparatus 200 is input to the optical scanning device 21M. An image signal relating to a cyan color component output from the document reading apparatus 200 is input to the optical scanning device 21C, and an image signal relating to a black color component output from the document reading apparatus 200 is input to the optical scanning device 21K. Hereinafter, constituent elements for forming a yellow image will be described, and the constituent elements for forming magenta, cyan, and black images are similar to those for yellow.

An outer circumferential surface of a photosensitive drum 22Y is charged by a charging device 23Y. After the outer circumferential surface of the photosensitive drum 22Y is charged, laser light in accordance with the image signal input to the optical scanning device 21Y from the document reading apparatus 200 is emitted to the outer circumferential surface of the photosensitive drum 22Y from the optical scanning device 21Y via the optical members, such as the polygon mirror and the mirror. Thus, an electrostatic latent image is formed on the outer circumferential surface of the photosensitive drum 22Y.

Subsequently, a development device 24Y serving as a development unit develops the electrostatic latent image with toner, so that a toner image is formed on the outer circumferential surface of the photosensitive drum 22Y. The toner image formed on the photosensitive drum 22Y is transferred to a transfer belt 27 serving as an intermediate transfer member by a transfer roller 25Y disposed at a position facing the photosensitive drum 22Y. Toner remaining on the outer circumferential surface of the photosensitive drum 22Y after the toner image is transferred to the transfer belt 27 is collected by a cleaning unit 26Y.

The toner images of yellow, magenta, cyan, and black transferred to the transfer belt 27 are transferred to a recording medium by a transfer roller pair 28. High voltage that is applied to the transfer roller pair 28 causes the toner images to be transferred to the recording medium. The registration rollers 20 convey the recording medium to the transfer roller pair 28 in synchronization with this transfer timing.

The recording medium on which a toner image is transferred as described above is conveyed to a fixing device 29 serving as a fixing unit, so that the fixing device 29 applies heat and pressure to the recording medium to fix the toner image onto the recording medium. Thus, the image forming apparatus 100 forms an image on the recording medium.

In a case where image formation is performed in a one-sided printing mode, the recording medium having passed through the fixing device 29 is discharged to a discharge tray 31 by discharge rollers 30. In a case where image formation is performed in a two-sided printing mode, the fixing device 29 performs the fixing processing on the first surface of the recording medium, and the recording medium is then conveyed to a reversing path 32 by reversing rollers 38. The first surface and the second surface of the recording medium conveyed to the reversing path 32 are reversed by the reversing rollers 38. The recording medium is then conveyed to a conveyance guide where conveyance rollers 33, 34, 35, and 36 are disposed. The recording medium is conveyed to the registration rollers 20 again by the conveyance rollers 33, 34, 35, and 36, and an image is formed on the second surface of the recording medium with the above-described method. Thereafter, the recording medium is discharged to the discharge tray 31 by the discharge rollers 30.

The configuration and the functions of the image forming apparatus 100 are described as the above.

<Control Configuration>

[Control Configuration of Image Printing Apparatus]

Figure 4:
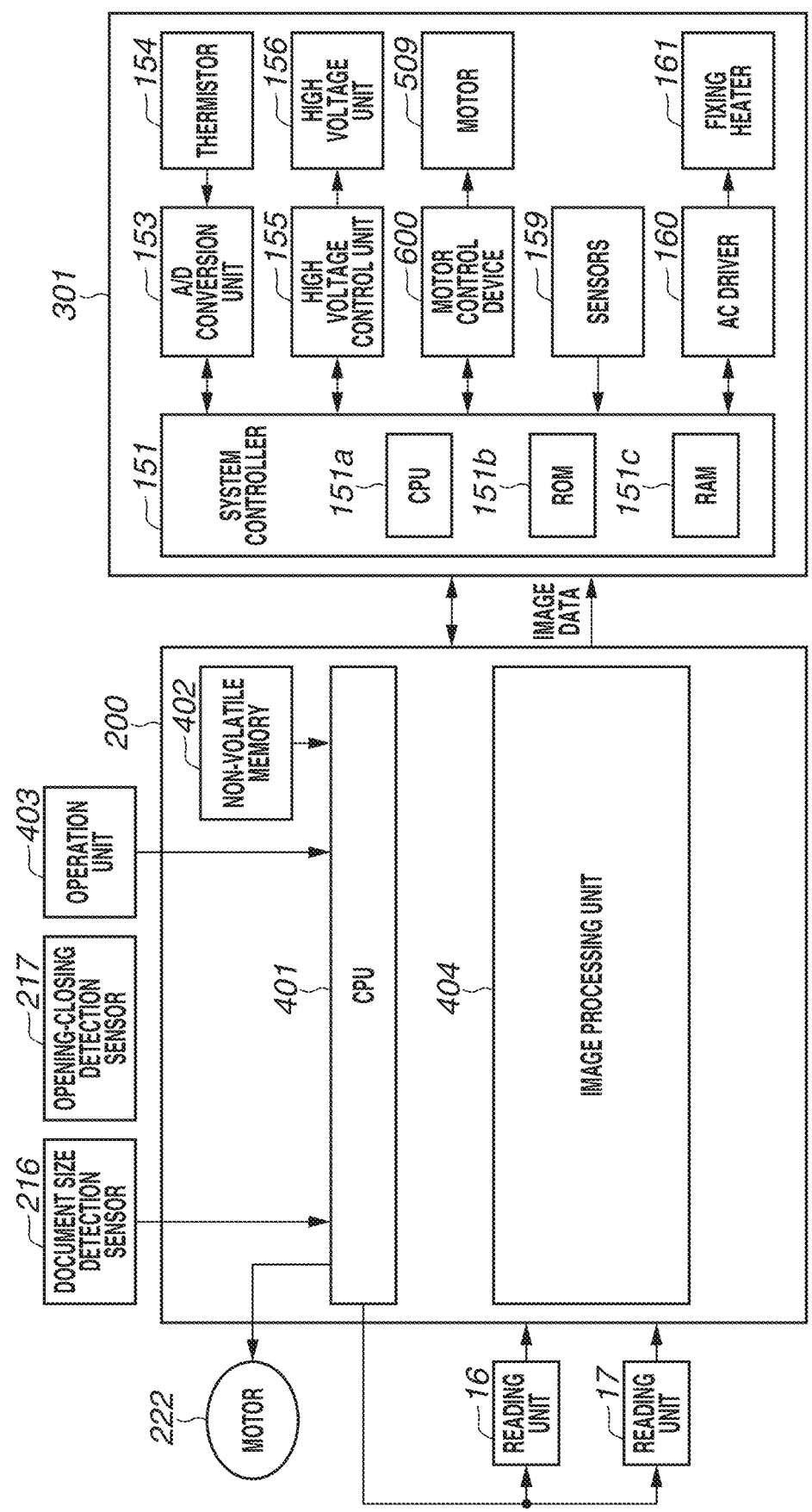
FIG. 4 is a block diagram illustrating an example of a control configuration of the image forming apparatus.

FIG. 4 is a block diagram illustrating an example of a control configuration of the image forming apparatus 100. Initially, a control configuration of the image printing apparatus 301 will be described.

As illustrated in FIG. 4, a system controller 151 includes a central processing unit (CPU) 151a, a read only memory (ROM) 151b, and a random access memory (RAM) 151c. The system controller 151 is connected to an analog to digital (A/D) conversion unit 153, a high voltage control unit 155, a motor control device 600, sensors 159, and an alternate current (AC) driver 160. The system controller 151 can communicate data and commands with the respective units connected thereto.

The CPU 151a reads and performs various programs stored in the ROM 151b to perform various sequences relating to a predetermined image forming sequence.

The RAM 151c serves as a storage device. For example, various types of data such as a setting value for the high voltage control unit 155 and an instruction value for the motor control device 600 are stored in the RAM 151c.

The system controller 151 receives signals from the sensors 159, and sets a setting value for the high voltage control unit 155 based on the received signals.

According to the setting value set by the system controller 151, the high voltage control unit 155 supplies necessary voltage to high voltage units 156 (e.g., a charging device 23Y, a development device 24Y, and a transfer charging device).

According to an instruction output from the CPU 151a, the motor control device 600 controls a motor 509 for driving a load, disposed on the image printing apparatus 301.

The A/D conversion unit 153 receives a detection signal output by a thermistor 154 for detecting a temperature of a fixing heater 161, converts the detection signal to a digital signal from an analog signal, and transmits the digital signal to the system controller 151. The system controller 151 controls the AC driver 160 based on the digital signal received from the A/D conversion unit 153. The AC driver 160 controls the fixing heater 161 to set a temperature of the fixing heater 161 to a temperature sufficient for performing fixing processing. The fixing heater 161 is included in the fixing device 29, and used for performing fixing processing.

The system controller 151 controls the operation sequence of the image forming apparatus 100 as described above.

[Control Configuration of Document Reading Apparatus]

Next, a control configuration of the document reading apparatus 200 will be described. A CPU 401 performs a program stored in a non-volatile memory 402 to control the document reading apparatus 200.

An operation unit 403 provides a user interface. The CPU 401 controls the operation unit 403 to display an operation screen on a display unit on the operation unit 403. In the operation screen, a user makes settings of, for example, a type of recording media (hereinafter, referred to as sheet type) to be used. The CPU 401 receives information about settings made by the user from the operation unit 403 and outputs the information about the settings made by the user to the system controller 151. The system controller 151 transmits information indicating a state of the image forming apparatus 100 to the operation unit 403. Examples of the information indicating a state of the image forming apparatus 100 includes information about the number of sheets on which images are to be formed, information about a progress status of image forming processing, and information about jamming of sheets or erroneous conveyance of sheets overlapping each other occurring in the image printing apparatus 301 or the document feeding apparatus 201. The operation unit 403 displays the information received from the system controller 151 on the display unit.

Image data output from each of the reading units 16 and 17 is input to an image processing unit 404. The image processing unit 404 converts analog image data to digital image data. The digital image data has a higher value with greater intensity of reflected light. Hereinafter, a level of this value is expressed as a luminance value. The image processing unit 404 performs correction such as known shading correction on the image data.

A detection result obtained by the opening-closing detection sensor 217 is input to the CPU 401. FIGS. 5A to 5C are diagrams illustrating a configuration for detecting an angle of the pressing plate 18 with respect to the reading apparatus 202 with the opening-closing detection sensor 217. FIG. 5A is a perspective diagram illustrating a configuration of the reading apparatus 202. FIG. 5B is a diagram illustrating a configuration of the opening-closing detection sensor 217. FIG. 5C is a table illustrating a relationship between the output of the opening-closing detection sensor 217 and the angle of the pressing plate 18 with respect to the reading apparatus 202.

As illustrated in FIG. 5A, the opening-closing detection sensor 217 for detecting the angle of the pressing plate 18 with respect to the reading apparatus 202 is disposed on the reading apparatus 202. As illustrated in FIG. 5B, the opening-closing detection sensor 217 includes photosensors 218 and 219 and a flag 220. Each of the photosensors 218 and 219 includes a light emitting portion for emitting light and a light receiving portion for receiving light. As illustrated in FIG. 5B-1, the flag 220 protrudes from the upper surface of the reading apparatus 202 when the pressing plate 18 (document feeding apparatus 201) is at an opening position. In a state illustrated in FIG. 5B-1, a high-level (H) signal is input to the CPU 401 from each of the photosensors 218 and 219.

When the user closes the pressing plate 18 partway, the pressing plate 18 presses the flag 220 downward. As a result, the flag 220 is positioned between the light emitting portion and the light receiving portion of the photosensor 218, and a level of the signal input to the CPU 401 from the photosensor 218 becomes low (L). When the user further closes the pressing plate 18, the pressing plate 18 further presses the flag 220 downward. As a result, the flag 220 is positioned between the light emitting portion and the light receiving portion of the photosensor 219, and a level of the signal input to the CPU 401 from the photosensor 219 becomes low (L).

The CPU 401 makes determination illustrated in FIG. 5C based on the signals received from the photosensors 218 and 219. More specifically, in a case where both of the signals received from the photosensors 218 and 219 are "L (OFF)", the CPU 401 determines that an angle θ of the pressing plate 18 with respect to the reading apparatus 202 is greater than 25°. In a case where the signal received from the photosensor 218 is "H (ON)" and the signal received from the photosensor 219 is "L (OFF)", the CPU 401 determines that the angle θ of the pressing plate 18 with respect to the reading apparatus 202 is greater than 5° and less than or equal to 25°.

In a case where both of the signals received from the photosensors 218 and 219 are "H (ON)", the CPU 401 determines that the angle θ of the pressing plate 18 with respect to the reading apparatus 202 is greater than or equal to 0° and less than or equal to 5°. Hereinafter, a state where the angle θ is greater than 25° is called "opening state", a state where the angle θ is greater than 5° and less than or equal to 25° is called "partly closed state", and a state where the angle θ is greater than or equal to 0° and less than or equal to 5° is called "closed state".

A detection result obtained by the document size detection sensor 216 is input to the CPU 401. In a case where the pressing plate reading method is performed, the CPU 401 determines the size of the document based on a detection result obtained by the document size detection sensor 216 and a reading result obtained by the reading unit 16.

FIG. 6 is a flowchart illustrating a method for determining the size of a document placed on the document positioning glass plate 214. The processing illustrated in this flowchart is performed by the CPU 401. A size (fixed size) specified by the Japanese Industrial Standards (JIS) is detected through the size detection.

In step S101, in response to the opening state of the pressing plate 18 being detected (YES in step S101), the processing proceeds to step S102. In step S102, the CPU 401 controls the motor 222 to move the reading unit 16 to a detection position. Thus, the reading unit 16 is moved to the lower side of the document positioning glass plate 214. Examples of the detection position include a position shifted toward the document size detection sensor 216 by 50 mm from the first abutting portion 223 indicated in FIG. 5A. The first abutting portion 223 refers to a portion on which one end of a document in the sub-scanning direction abuts when the user places the document on the document positioning glass plate 214. The reading apparatus 202 also has a second abutting portion 221 on which another end of the document in a main scanning direction abuts when the user places the document on the document positioning glass plate 214. The user positions the document to be placed on the document positioning glass plate 214 by making the document abut on the first abutting portion 223 and the second abutting portion 221. Here, in a stand-by state, the reading unit 16 is located between the document positioning glass plate 214 and the reading glass 108 in the sub-scanning direction, for example.

Next, in step S103, the CPU 401 acquires a detection result from the document size detection sensor 216 and stores the detection result in a memory (not illustrated).

In step S104, in response to a closed state of the pressing plate 18 being detected (YES in step S104), the processing proceeds to step S105. In step S105, the CPU 401 turns on the LED 110 disposed on the reading unit 16.

Thereafter, in step S106, the CPU 401 performs document size detection processing. The document size detection processing will be described below.

In step S107, the CPU 401 turns off the LED 110 disposed on the reading unit 16. Then in step S108, the CPU 401 controls the motor 222 to move the reading unit 16 to a stand-by position.

Figure 7:
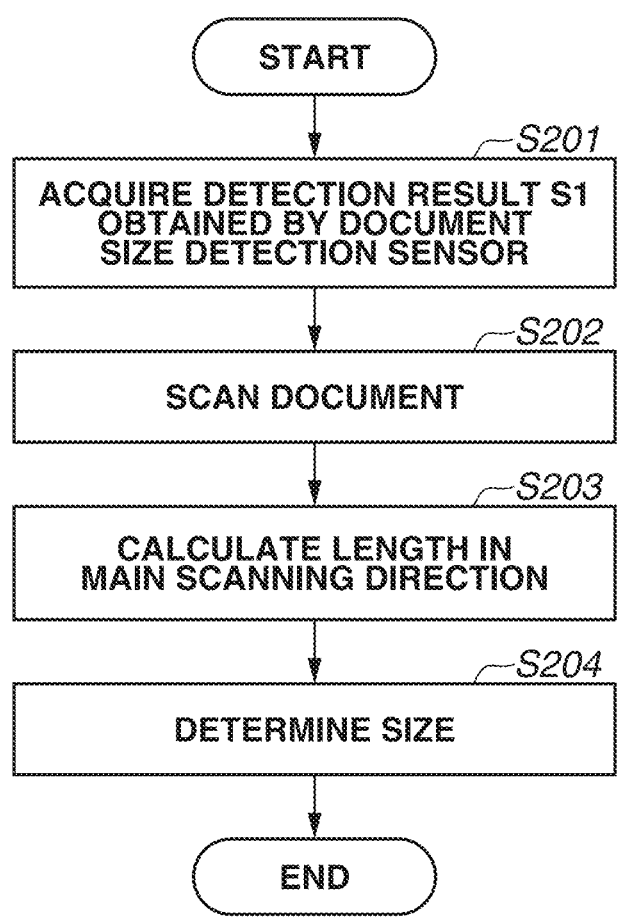
FIG. 7 is a flowchart illustrating processing for detecting a size of a document.

FIG. 7 is a flowchart illustrating the processing performed in step S106 (document size detection processing) of the flowchart in FIG. 6. The processing illustrated in this flowchart is performed by the CPU 401.

In step S201, the CPU 401 acquires a detection result S1 obtained by the document size detection sensor 216 and stores the detection result S1 in a memory (not illustrated).

Thereafter, in step S202, the CPU 401 controls the motor 222 to move the reading unit 16 from the detection position to the stand-by position. The reading unit 16 reads (scans) a document placed on the document positioning glass plate 214 while being moved from the detection position to the stand-by position.

In step S203, based on the image acquired by the reading unit 16 in step S202, the CPU 401 calculates (determines) a length of the document in the main scanning direction placed on the document positioning glass plate 214. More specifically, the CPU 401 determines, for example, a position of one end opposite to another end abutting on the second abutting portion 221 from among the ends of the document placed on the document positioning glass plate 214, based on the image acquired by the reading unit 16 in step S202. The CPU 401 determines a length from the determined position of the one end to the second abutting portion 221 in the main scanning direction to be a length of the document in the main scanning direction placed on the document positioning glass plate 214.

In step S204, the CPU 401 determines the size of the document.

FIG. 8 is a table illustrating a method for detecting a document size. In a case where a document is present above the document size detection sensor 216 in the sub-scanning direction, values of the detection results S1 and S0 are the same. On the other hand, in a case where the document is not present above the document size detection sensor 216 in the sub-scanning direction, values of the detection results S1 and S0 are different. This situation occurs because of the following reasons. When the pressing plate 18 is open without the document above the document size detection sensor 216 in the sub-scanning direction, light emitted from the light emitting portion of the document size detection sensor 216 is not incident on the light receiving portion. On the other hand, when the pressing plate 18 is closed with the document above the document size detection sensor 216 in the sub-scanning direction, light emitted from the light emitting portion of the document size detection sensor 216 is reflected on the pressing plate 18 and incident on the light receiving portion. Thus, in a case where the document is not present above the document size detection sensor 216 in the sub-scanning direction, values of the detection results S1 and S0 are different.

The CPU 401 determines a length of the document in the sub-scanning direction as "Large" in a case where values of the detection results S0 and S1 are the same, and determines a length of the document in the sub-scanning direction as "Small" in a case where values of the detection results S0 and S1 are different. The CPU 401 determines, based on this determination result and the length in the main scanning direction determined based on the image acquired by the reading unit 16 in step S202, the size of the document according to the table in FIG. 8.

[Reading Mode]

Reading modes of the reading apparatus 202 according to the present exemplary embodiment will now be described. The reading apparatus 202 according to the present exemplary embodiment includes a normal scanning mode, a first multi-cropping mode, and a second multi-cropping mode as the reading modes of the pressing plate reading method. For example, the user can set a reading mode using the operation unit 403.

<Normal Scanning Mode>

In response to the user inputting an instruction to start reading of a document with the normal scanning mode set, the CPU 401 controls the motor 222 to move the reading unit 16 in the sub-scanning direction. More specifically, the CPU 401 moves the reading unit 16 by a length, in the sub-scanning direction, corresponding to the size determined through the size detection processing. The reading unit 16 reads an image of a document placed on the document positioning glass plate 214 while moving in the sub-scanning direction.

The CPU 401 generates an image file based on a reading result obtained by the reading unit 16, and outputs the image file to an apparatus external to the image forming apparatus 100 (such an external apparatus includes a smartphone, a PC, and a tablet apparatus). The image size of the image file is the size determined through the size detection processing.

<First Multi-Cropping Mode>

The first multi-cropping mode is now described. In the first multi-cropping mode, the reading apparatus 202 collectively reads a plurality of documents placed on the document positioning glass plate 214, extracts images of the documents from a read image, and generates an image file for the respective images of the documents.

[Edge Detection for Image]

In the first multi-cropping mode, the CPU 401 detects candidates for an edge of each image included in a read image. In the processing for detecting an edge of each image, for example, a known method using a differential filter, such as the Canny method, is used.

Figure 9A:
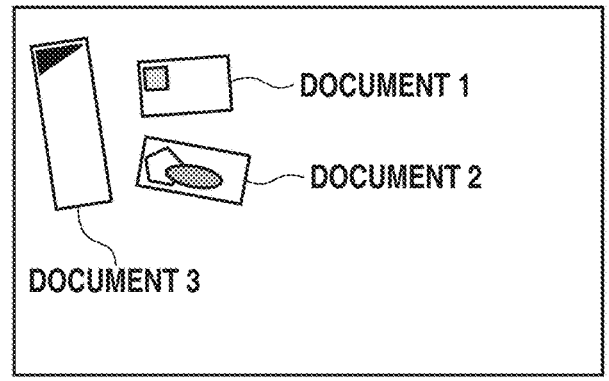
FIGS. 9A to 9D are diagrams illustrating processing for detecting an edge of an image.
Figure 9B:
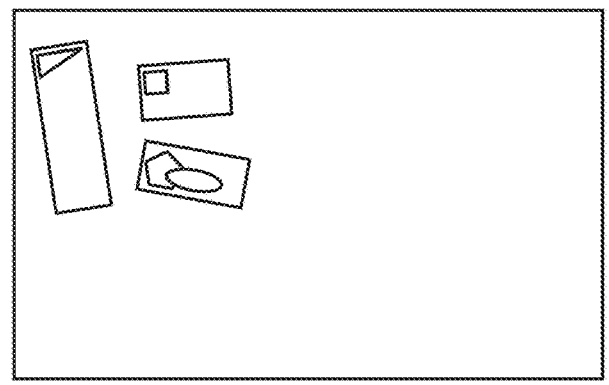

FIGS. 9A to 9D are diagrams illustrating the processing for detecting an edge of the respective images. FIG. 9A illustrates a read image of three documents placed on the document positioning glass plate 214. The read image in FIG. 9A is acquired when the documents 1, 2, and 3 placed on the document positioning glass plate 214 are read collectively. FIG. 9B is a diagram illustrating an image which is acquired when edge detection processing is performed on the image illustrated in FIG. 9A. As illustrated in FIG. 9B, performing the edge detection processing detects also edges of objects in the documents 1, 2, and 3 in addition to the edges of the documents 1, 2, and 3.

[Processing for Detecting Candidate for Edge of Document]

Next, the CPU 401 performs, on the images of the detected edges, image processing employing a known method such as an edge tracking method for detecting an independent area by tracking a connection between edge pixels or Hough transformation method for detecting a candidate for a straight line from an edge image.

Figure 9C:
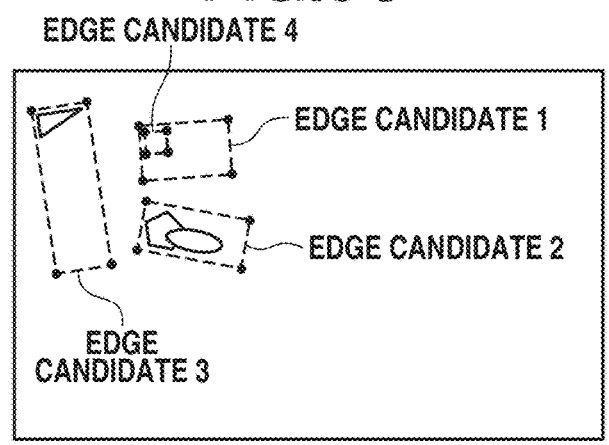
Figure 10A:
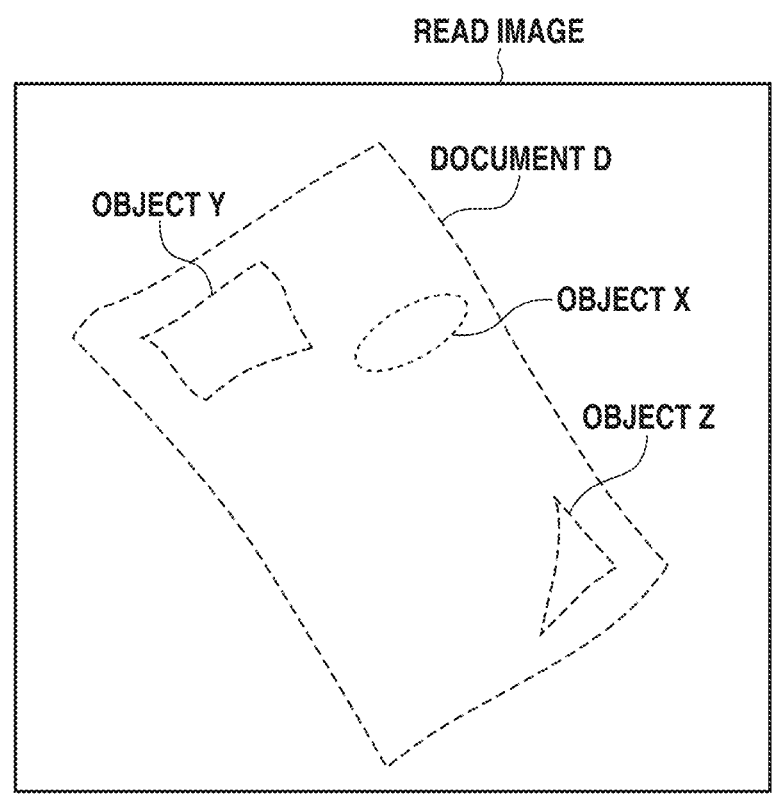
FIGS. 10A and 10B are diagrams illustrating processing for detecting a document edge candidate.
Figure 10B:
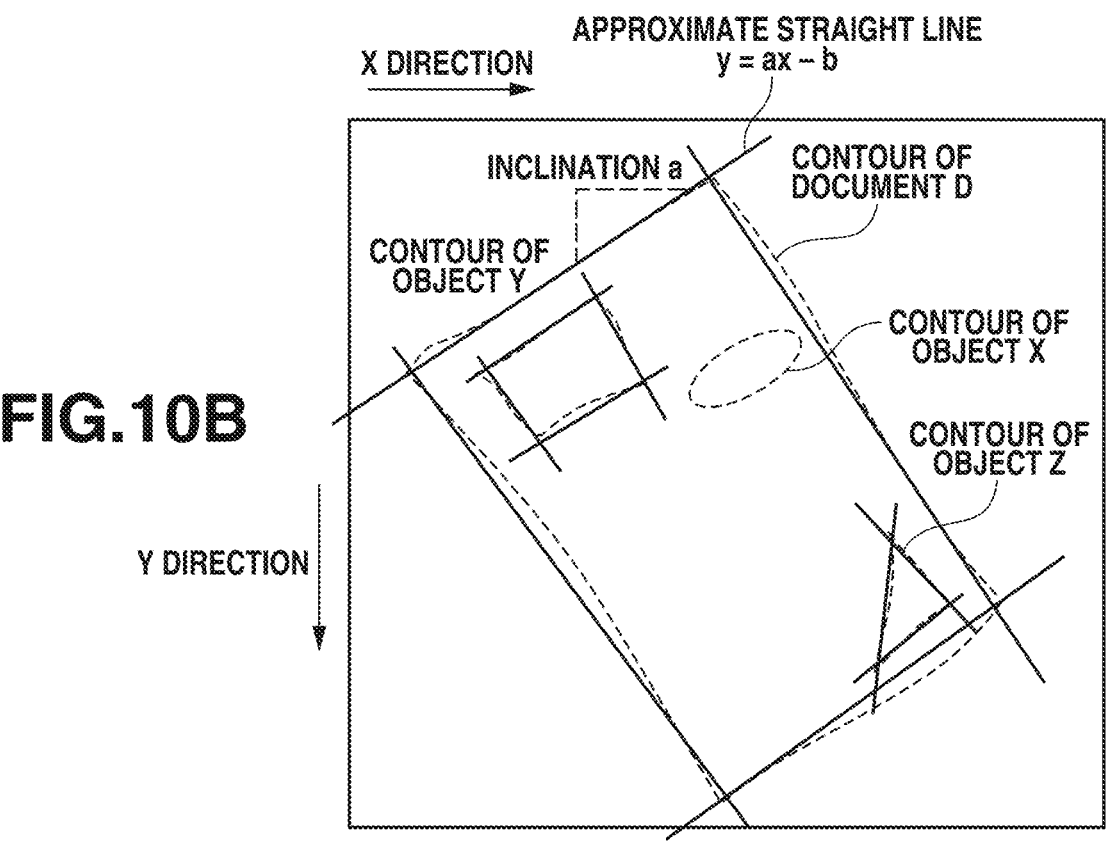

FIGS. 10A and 10B are diagrams illustrating the processing for detecting a candidate for an edge of a document. FIG. 10A illustrates an edge of a document D and edges of objects X, Y, and Z included in the document D detected with the edge tracking method. FIG. 10B illustrates an image which is acquired when the Hough transformation is performed on the detected edges. The X direction corresponds to the main scanning direction, and the Y direction corresponds to the sub-scanning direction. In the processing for detecting a candidate for an edge of a document, the contour of a square area having an edge formed by four straight lines is determined to be a candidate for the edge of the document. For example, in FIG. 10B, the edge of the object Y and the edge of the document D are determined to be edge candidates for the document. Through these processes, edge candidates 1 to 4 for the documents 1 to 3 as illustrated in FIG. 9C are determined.

[Processing for Determining Edge of Document]

Figure 11A:
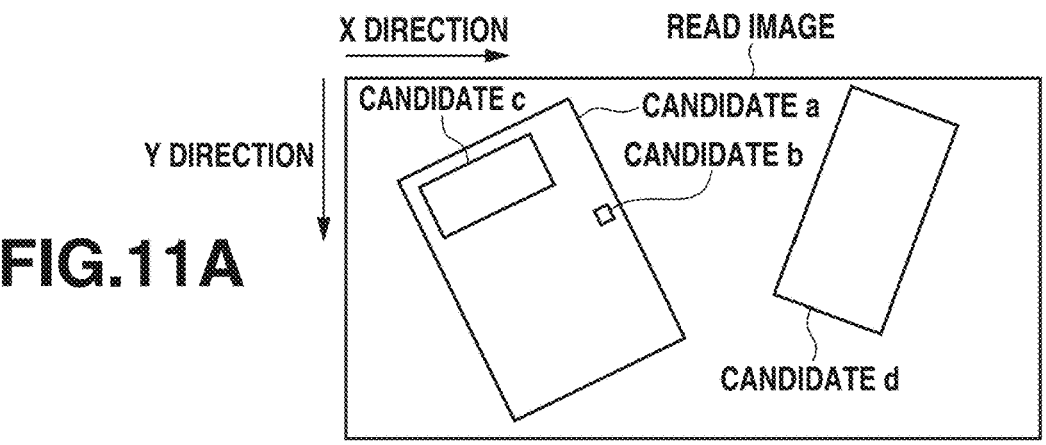
FIGS. 11A to 11D are diagrams illustrating processing for determining an edge of a document.

FIGS. 11A to 11D are diagrams illustrating processing for determining the edge of a document. FIG. 11A illustrates candidates a, b, c, and d as candidates for edges of documents. Hereinafter, although the processing that the CPU 401 performs on the candidate a will be described, the CPU 401 performs the below-described processing on each of the candidates.

Figure 11B:
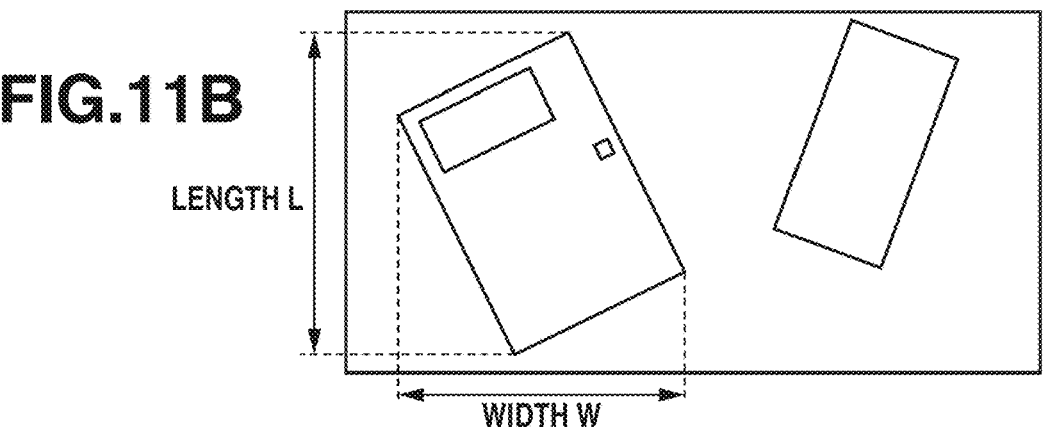
Figure 11C:
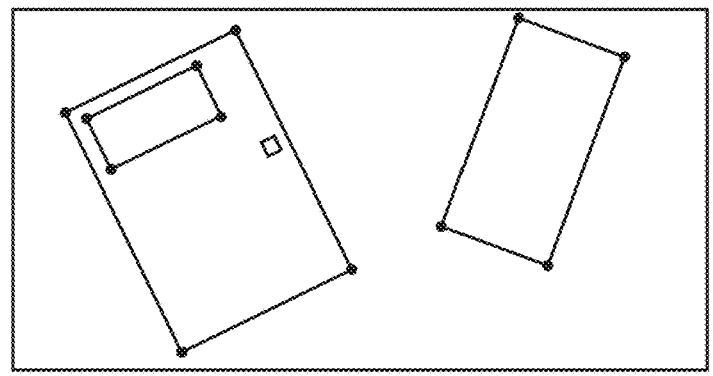

As illustrated in FIG. 11B, the CPU 401 calculates a length (width) W in the X direction and a length L in the Y direction of the candidate a. In a case where the candidate a satisfies at least any one of conditions that the width W is less than a predetermined width WO and that the length L is less than a predetermined length LO, the CPU 401 determines that the candidate a is not the contour of a document.

In contrast to this, in a case where the candidate a does not satisfy both of the conditions that the width W is less than the predetermined width WO and that the length L is less than the predetermined length LO, the CPU 401 performs the following processing. The CPU 401 determines whether the candidate a is present within an area surrounded by any of the candidates b, c, and d. More specifically, for example, the CPU 401 determines whether four vertexes of the candidate a is present within an area surrounded by any of the candidates b, c, and d (i.e., whether the area surrounded by the candidate a overlaps with at least any one of the areas surrounded by the other candidates b, c, and d). For example, in a case where the read image is an image illustrated in FIG. 11C, the CPU 401 determines that the candidate a is the edge of the document because none of the four vertexes of the candidate a is present within the area surrounded by any one of the other candidates b, c, and d.

Figure 11D:
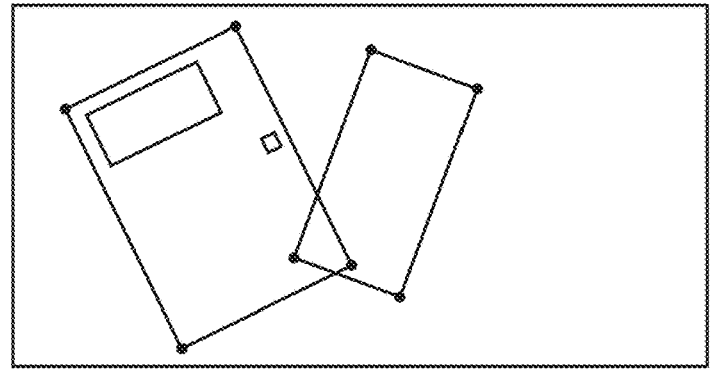

In contrast to this, in a case where the read image is such an image as illustrated in FIG. 11D, the candidate a cannot be determined to be the edge of the document because one of the vertexes of the candidate a is present within the area surrounded by the candidate d. Through this processing, in the image illustrated in FIG. 9C, the edge candidate 4 is not determined to be the edge of the document, and edge candidates 1, 2, and 3 are determined to be the edges of the documents.

Figure 12:
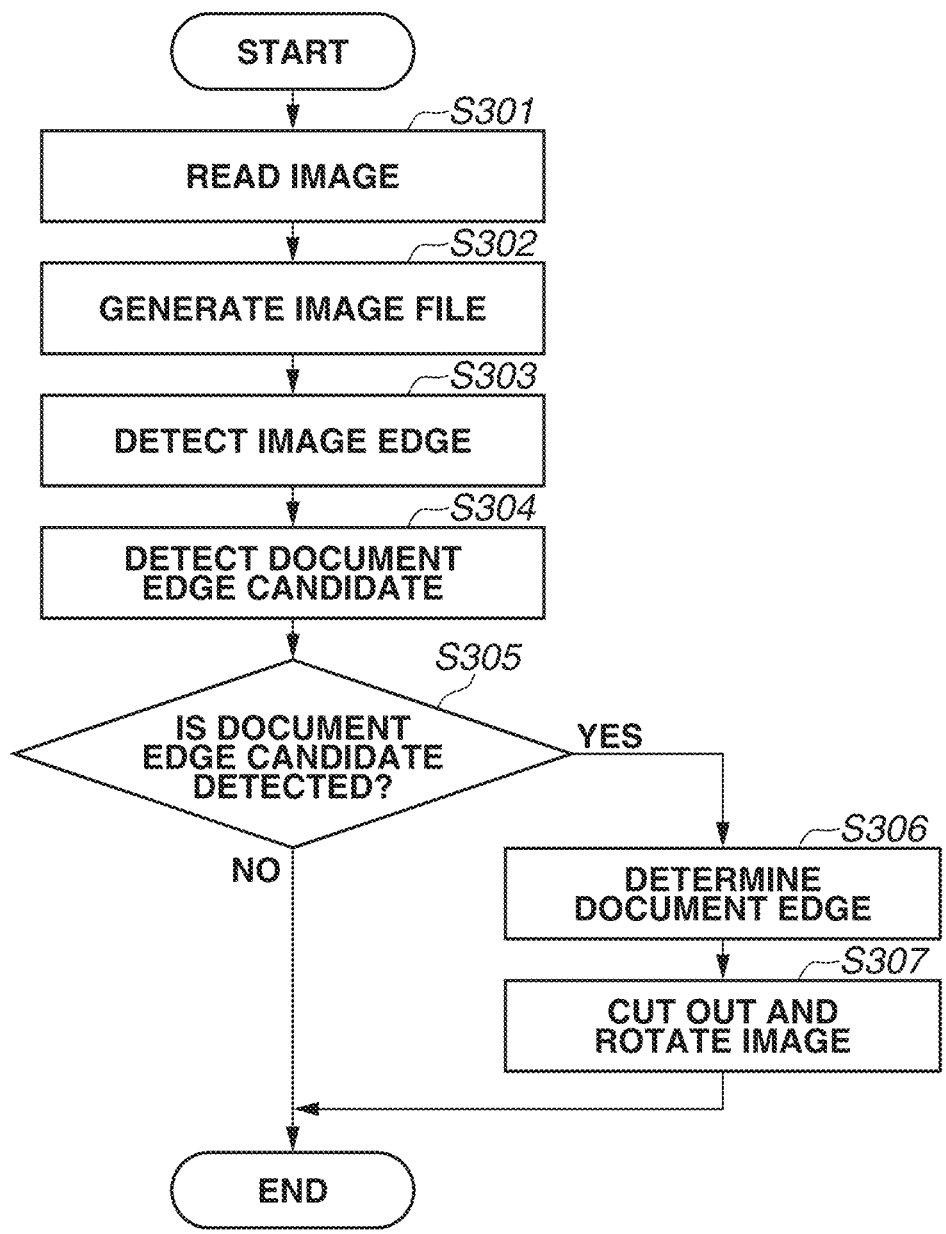
FIG. 12 is a flowchart illustrating a normal multi-cropping mode (first multi-cropping mode).

FIG. 12 is a flowchart illustrating the first multi-cropping mode according to the present exemplary embodiment. The processing illustrated in this flowchart is performed by the CPU 401. The processing illustrated in the flowchart is started in response to the CPU 401 receiving an instruction to start reading of a document in a state where the first multi-cropping mode is selected.

In step S301, the CPU 401 moves the reading unit 16 to scan a readable area that is readable by the reading unit 16. The reading unit 16 reads images of a plurality of documents placed on the document positioning glass plate 214 while moving in the sub-scanning direction. For example, the size of the readable area is greater than or equal to a maximum size (e.g., A3-size) among a fixed-size document which can be placed on and fit into the document positioning glass plate 214. Further, the size of the readable area is smaller than or equal to the size of the placement surface (i.e., a surface on which a document is placed) of the document positioning glass plate 214. As an example, FIG. 2 illustrates a readable area 250 and an A3-size document P that is positioned by being made to abut on the first abutting portion 223 and the second abutting portion 221 on the document positioning glass plate 214.

Next in step S302, the CPU 401 generates an image file (see FIG. 9A) including images of a plurality of documents placed on the document positioning glass plate 214, based on the reading result obtained by the reading unit 16.

In step S303, the CPU 401 then performs the processing for detecting edges of the images from the image of the image file generated in step S302.

In step S304, the CPU 401 then performs the processing for determining (detecting) candidates for the edges of the documents. The CPU 401 stores the detected candidates for the edges of the documents in a memory (not illustrated).

In step S305, if no candidates for the edges of the documents is detected (NO in step S305), the CPU 401 ends the processing of this flowchart.

In step S305, if a candidate for the edges of the documents is present (YES in step S305), the processing proceeds to step S306. In step S306, the CPU 401 performs the processing for determining the edges of the documents.

Figure 9D:

In step S307, the CPU 401 cuts out images based on the edges of the documents determined in step S306. Further, the CPU 401 rotates the cut-out images, generates image files, and outputs the image files to the apparatus external to the image forming apparatus 100 (such an external apparatus includes a smartphone, a PC, or a tablet apparatus). The images of the documents are generated as separate image files as illustrated in FIG. 9D. The CPU 401 may cut out the images after rotating the images.

[Second Multi-Cropping Mode]

Next, the second multi-cropping mode will be described. In the present exemplary embodiment, by applying the following configuration as the second multi-cropping mode, an image reading apparatus capable of easily cutting out images of documents from an image including the images of the documents is provided. Hereinafter, the second multi-cropping mode will be described using a case where a transparent document folder of a predetermined size that holds a plurality of documents is used. While the predetermined size described in the present exemplary embodiment corresponds to an A4-size, the predetermined size may be a size corresponding to a B5-size or a legal-size. Examples of the plurality of documents include a receipt, a sales slip, and a sticky note.

Figure 13:
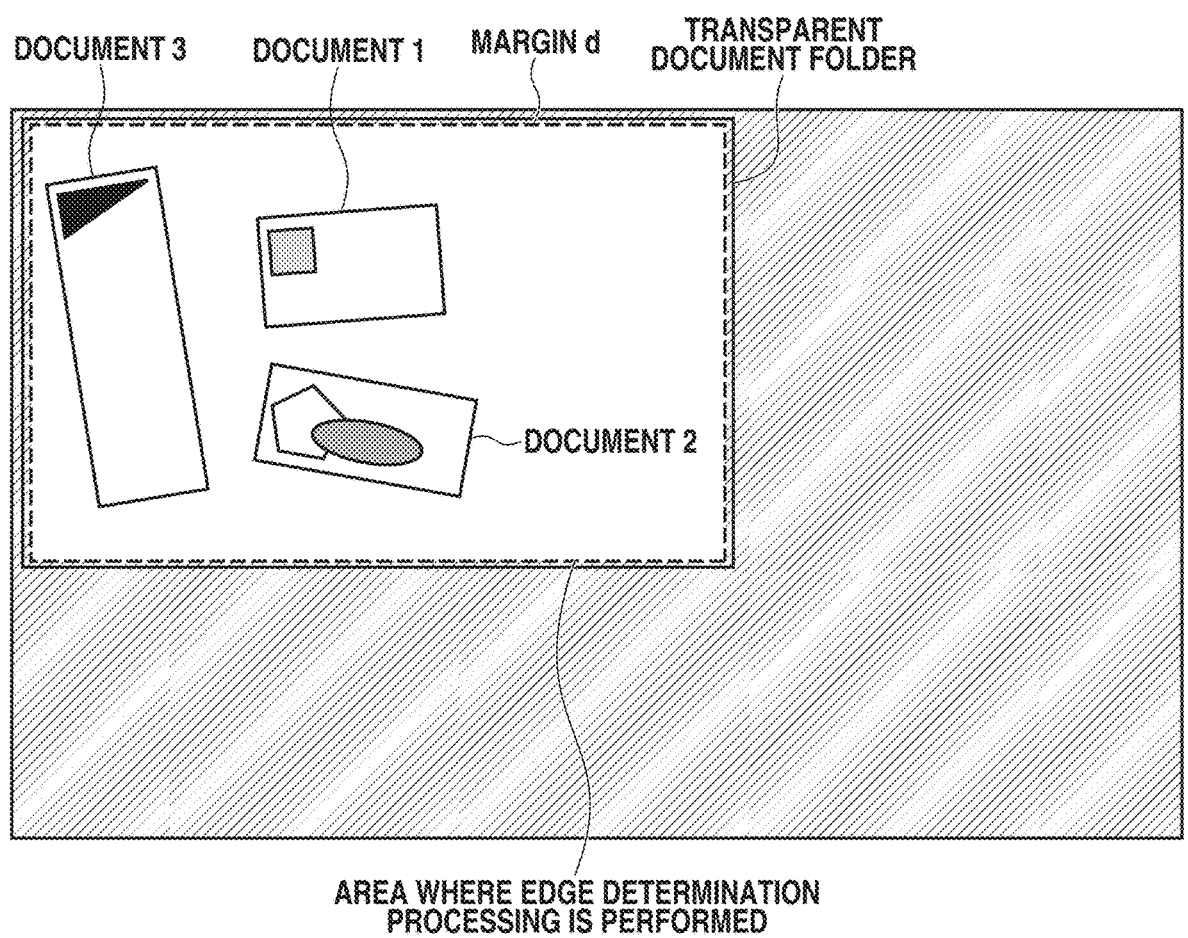
FIG. 13 is a diagram illustrating an area on which processing for determining an edge of a document according to a first exemplary embodiment is performed.

FIG. 13 is a diagram illustrating an area on which the processing for determining an edge of a document is to be performed. FIG. 13 illustrates an image read by the reading unit 16 in a state where a transparent document folder holding documents 1, 2, and 3 is placed on the document positioning glass plate 214 with the transparent document folder abutting on the first abutting portion 223 and the second abutting portion 221.

In the second multi-cropping mode according to the present exemplary embodiment, processing for determining an edge of a document is performed on an image included in an area corresponding to the transparent document folder (i.e., the area surrounded by a dashed line, which excludes the shaded area in FIG. 13). The area corresponding to the transparent document folder corresponds to, for example, an area where the transparent document folder is present when the transparent document folder is positioned with the aid of the first abutting portion 223 and the second abutting portion 221 and is placed on the document positioning glass plate 214. Further, the area corresponding to the transparent document folder corresponds to an area that excludes one edge opposite to another edge abutting on the first abutting portion 223 from among the edges in the main scanning direction of the transparent document folder having been positioned. Furthermore, the area corresponding to the transparent document folder corresponds to an area that excludes one edge opposite to another edge abutting on the second abutting portion 221 from among the edges in the sub-scanning direction of the transparent document folder having been positioned. In other words, the area corresponding to the transparent document folder has a length shorter than a length of the transparent document folder by a predetermined margin d in the main scanning direction and a length shorter than a length of the transparent document folder by a predetermined margin d in the sub-scanning direction.

Figure 14:
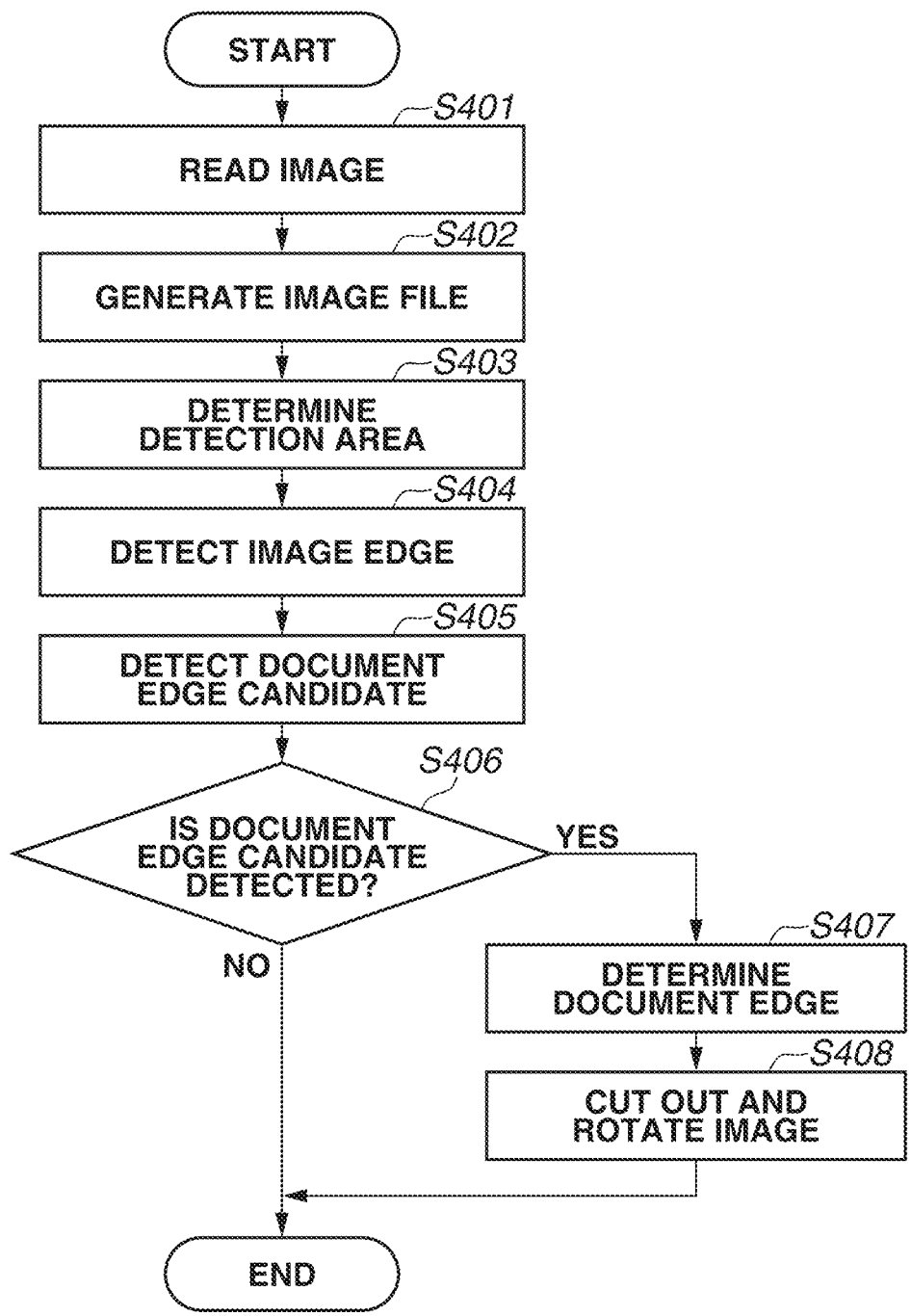
FIG. 14 is a flowchart illustrating a filed document multi-cropping mode (second multi-cropping mode) according to the first exemplary embodiment.

FIG. 14 is a flowchart illustrating the second multi-cropping mode according to the present exemplary embodiment. The processing illustrated in this flowchart is performed by the CPU 401. The processing of this flowchart is started in response to the CPU 401 receiving an instruction to start reading of a document with the second multi-cropping mode set.

The operations in steps S401 and S402 are similar to those in steps S301 and S302 in FIG. 12, so that descriptions thereof are omitted.

In step S403, the CPU 401 determines an area on which the edge detection processing is to be performed, as illustrated in FIG. 13.

The operations in steps S404 to S408 are similar to those in steps S303 to S307 in FIG. 12, so that descriptions thereof are omitted.

As described above, in the second multi-cropping mode according to the present exemplary embodiment, the processing for determining an edge of a document is performed on the image included in the area corresponding to the transparent document folder (i.e., the area surrounded by a dashed line, which excludes the shaded area in FIG. 13). This makes it possible to prevent images of a plurality of documents from being output as a single image, which is caused by an image being cut out based on the edge of the transparent document folder. Thus, individual images of a plurality of documents can be cut out from the image that includes the plurality of images of the documents read by using the transparent document folder. In other words, it is possible to provide an image reading apparatus capable of easily cutting out individual images of documents from an image including the images of the documents.

The operation unit 403 may issue a notification that prompts the user to place the transparent document folder on the document positioning glass plate 214 and make the transparent document folder abut on the first abutting portion 223 and the second abutting portion 221, in response to the second multi-cropping mode being selected via the operation unit 403.

The area corresponding to the transparent document folder may correspond to an area excluding both of one edge abutting on the first abutting portion 223 and another edge opposite to the one edge from among the edges in the main scanning direction of the transparent document folder having been positioned. The area corresponding to the transparent document folder may also correspond to an area excluding both of one edge abutting on the second abutting portion 221 and another edge opposite to the one edge from among the edges in the sub-scanning direction of the transparent document folder having been positioned.

In the second multi-cropping mode according to the present exemplary embodiment, detection of an image edge, detection of a document edge candidate, and determination of a document edge are performed after a detection area is determined. The present exemplary embodiment is not limited thereto. For example, the area for determination of the document edge may be determined after detection of the image edge is performed. In other words, detection of the image edge is performed on a read image of the entire readable area 250. Thus, an edge of the transparent document folder is detected as the image edge.

Detection of the document edge candidate and determination of the document edge may be performed on the image included in the area corresponding to the transparent document folder (i.e., the area surrounded by a dashed line, which excludes the shaded area in FIG. 13).

For example, an area for determination of the document edge may be determined after detection of the image edge and detection of the document edge candidate are performed. In other words, detection of the image edge and detection of the document edge candidate are performed on a read image of the entire readable area 250. Thus, an edge of the transparent document folder is detected as the document edge candidate. Determination of the document edge may be performed on the image included in the area corresponding to the transparent document folder (i.e., the area surrounded by a dashed line, which excludes the shaded area in FIG. 13).

In the present exemplary embodiment, a description has been provided using a case where the transparent document folder is used. In another exemplary embodiment, any holding member that has a transparent portion and is capable of holding a document may be used. The transparent document folder is included in the holding member.

A second exemplary embodiment of the present disclosure will be described below. Descriptions of configurations of the image forming apparatus 100 similar to those described in the first exemplary embodiment will be omitted.

<Second Multi-Cropping Mode>

The second multi-cropping mode according to a second exemplary embodiment will be described. In the present exemplary embodiment, a screen for setting the size of the transparent document folder is displayed on the operation unit 403 in response to the second multi-cropping mode being selected by the user.

Figure 15:
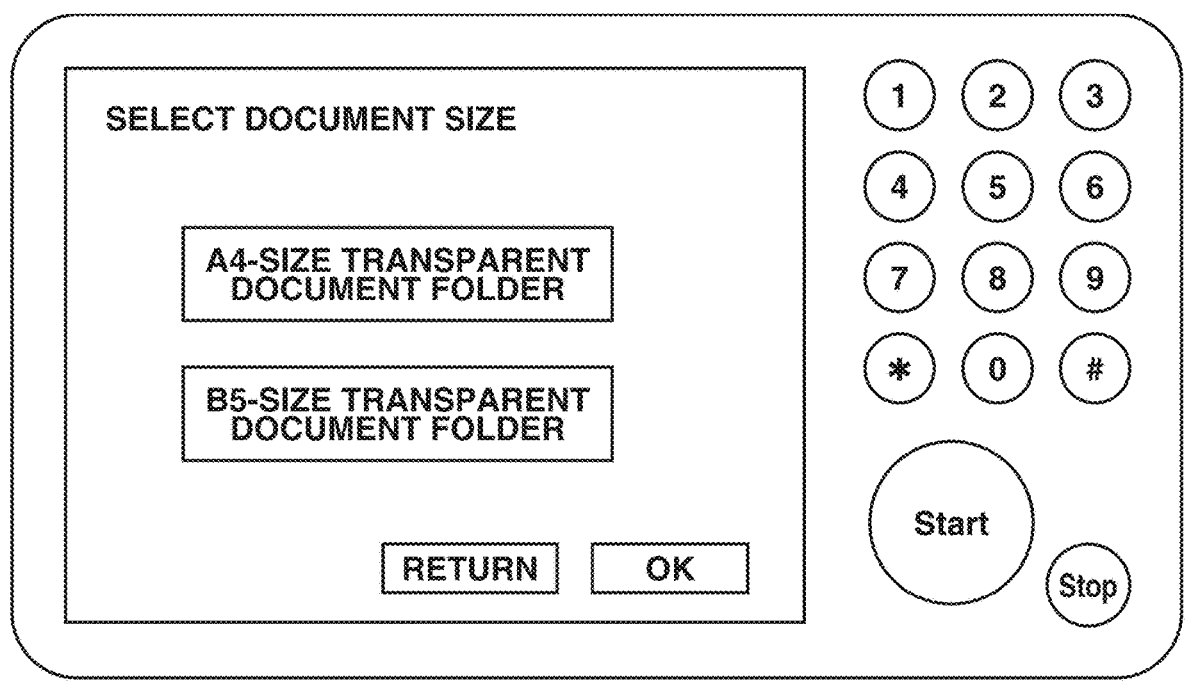
FIG. 15 is a diagram illustrating a screen for setting a size in the filed document multi-cropping mode.

FIG. 15 is a diagram illustrating a screen for setting the size in the second multi-cropping mode.

The user can select the size of the transparent document folder based on the screen illustrated in FIG. 15. While options, such as "A4-size Transparent Document Folder" and "B5-size Transparent Document Folder", are displayed on the screen in FIG. 15, other options of other sizes, such as "Legal-size Transparent Document Folder", may also be displayed thereon. Hereinafter, a description will be provided of a case where "A4-size Transparent Document Folder" is selected.

The CPU 401 determines an area on which the edge detection processing is to be performed based on the size set by the user using the screen illustrated in FIG. 15. More specifically, the processing for determining an edge of a document is performed on the image included in the area corresponding to the A4-size transparent document folder (i.e., the area surrounded by a dashed line, which excludes the shaded area in FIG. 13), as described in the first exemplary embodiment.

As described above, according to the present exemplary embodiment, in response to the second multi-cropping mode being selected by the user, a screen for setting the size of the transparent document folder is displayed on the operation unit 403. The CPU 401 then determines an area on which the edge detection processing is to be performed based on the size set by the user using the screen in FIG. 15. Thus, the processing for determining the edge of the document is performed on the image included in the area corresponding to the transparent document folder. This makes is possible to prevent images of a plurality of documents from being output as a single image, which is caused by an image being cut out based on the edge of the transparent document folder. Further, the individual images of the plurality of documents can be cut out from the image that includes the images of the plurality of documents read by using the transparent document folder. In other words, it is possible to provide an image reading apparatus capable of easily cutting out individual images of documents from an image including the images of the documents.

The area on which the edge detection processing is to be performed may be determined based on the size determined through the method illustrated in FIG. 6, described in conjunction with the first exemplary embodiment.

A third exemplary embodiment of the present disclosure will be described below. Descriptions of configurations of the image forming apparatus 100 similar to those described in the first exemplary embodiment will be omitted.

<Second Multi-Cropping Mode>

The second multi-cropping mode according to the present exemplary embodiment will be described. Hereinafter, a description will be provided of a case where a transparent document folder of a predetermined size that holds a plurality of documents is used. While the predetermined size described in the present exemplary embodiment corresponds to an A4-size, the predetermined size may be a B5-size, a legal-size, and the like.

Figure 16:
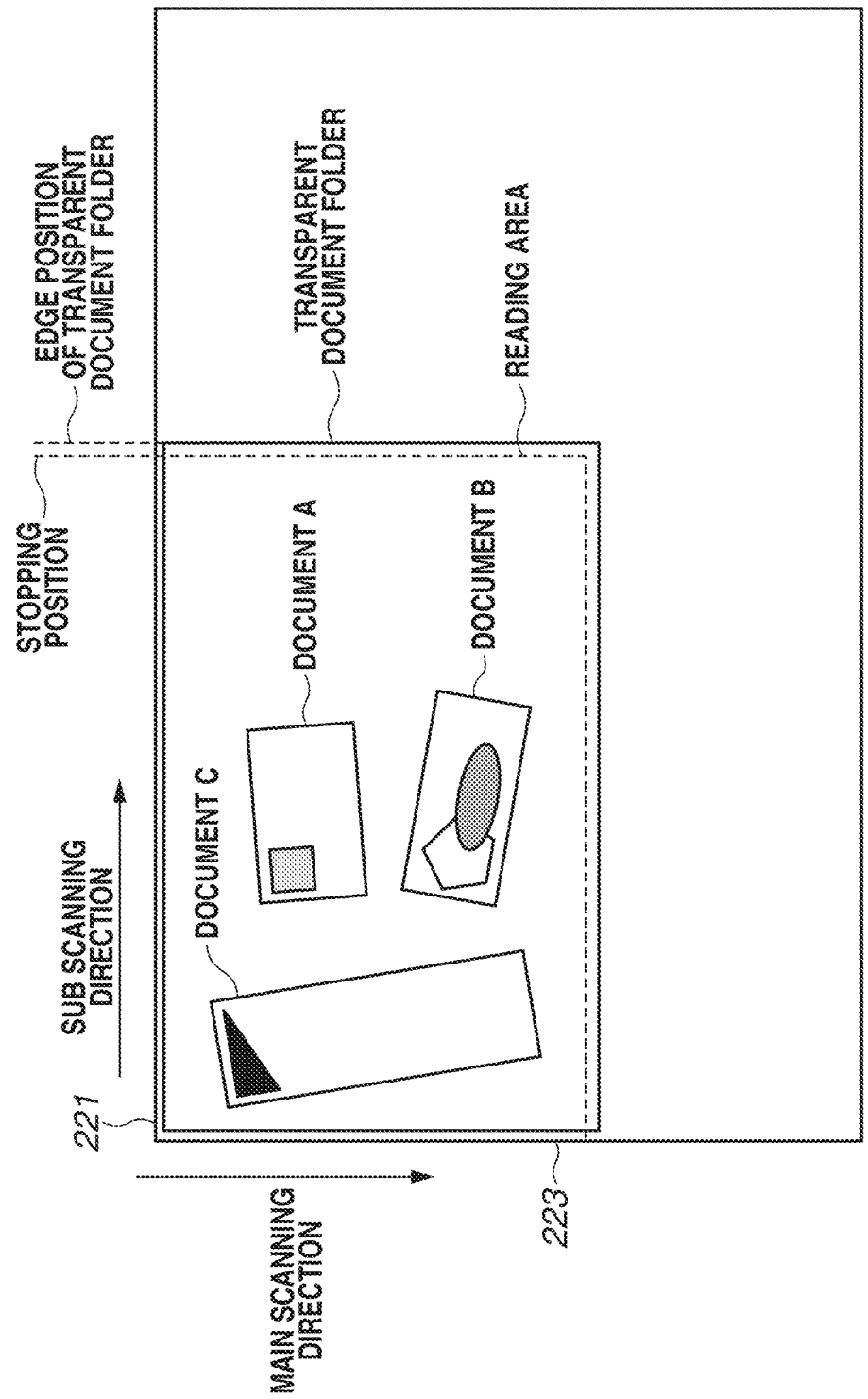
FIG. 16 is a diagram illustrating a state where a transparent document folder is placed on a document positioning glass plate with the transparent document folder abutting on a first abutting portion and a second abutting portion.

FIG. 16 is a diagram illustrating a state where a transparent document folder is placed on the document positioning glass plate 214 with the transparent document folder abutting on the first abutting portion 223 and the second abutting portion 221. In the present exemplary embodiment, the CPU 401 controls the reading unit 16 and the motor 222 to read only the area surrounded by a dashed line in FIG. 16.

More specifically, the CPU 401 controls the reading unit 16 and the motor 222 to read only an area corresponding to the transparent document folder in the sub-scanning direction. Yet more specifically, for example, the CPU 401 moves the reading unit 16 rightward in FIG. 16 from the first abutting portion 223. The CPU 401 stops the reading unit 16 at a position (stopping position) on the left side of one edge opposite to another edge abutting on the first abutting portion 223, from among the edges in the main scanning direction of the transparent document folder having been positioned. In other words, the CPU 401 controls the reading unit 16 to read an image of a section ranging from an edge position of the transparent document folder abutting on the first abutting portion 223 to the stopping position. The CPU 401 controls the reading unit 16 to read only an area corresponding to the transparent document folder in the main scanning direction. More specifically, the CPU 401 controls the reading unit 16 to read an area having a length shorter than a length of the transparent document folder in the main scanning direction. In other words, in the present exemplary embodiment, a reading area read by the reading unit 16 has a length shorter than a length of the transparent document folder by a predetermined margin d in the main scanning direction and a length shorter than a length of the transparent document folder by a predetermined margin d in the sub-scanning direction.

The CPU 401 performs the processing for determining an edge of a document on the read image.

As described above, the CPU 401 controls the reading unit 16 and the motor 222 to read only the area corresponding to the transparent document folder in the present exemplary embodiment. The processing for determining an edge of a document is then performed on the read image. Thus, the processing for determining an edge of a document is performed on the image included in the area corresponding to the transparent document folder. This makes it possible to possible to prevent images of a plurality of documents from being output as a single image, which is caused by an image being cut out based on the edge of the transparent document folder. Further, the individual images of the plurality of documents can be cut out from the image that includes the images of the plurality of documents read by using the transparent document folder. In other words, it is possible to provide an image reading apparatus capable of easily cutting out individual images of documents from an image including the images of the documents A moving distance of the reading unit 16 in the present exemplary embodiment is shorter than a moving distance thereof in reading the entire readable area 250. Thus, readout time in the filed document multi-cropping mode (i.e., second multi-cropping mode) can be reduced to be shorter than readout time in the normal multi-cropping mode (i.e., first multi-cropping mode). Therefore, it is possible to improve the productivity of the image reading apparatus.

In the present exemplary embodiment, the CPU 401 controls the reading unit 16 to read only the area corresponding to the transparent document folder in the main scanning direction. However, the present exemplary embodiment is not limited thereto. For example, the CPU 401 may control the reading unit 16 to read an area corresponding to the length of the image sensor 111.

In response to the second multi-cropping mode being selected by the user, the screen for the user to set the size of a transparent document folder illustrated in FIG. 15 may be displayed on the operation unit 403. The CPU 401 may control the reading area of the reading unit 16 through the above-described method based on the size set by the user using the screen in FIG. 15.

A fourth exemplary embodiment of the present disclosure will be described. Descriptions of the configurations of the image forming apparatus 100 similar to those described in the first exemplary embodiment will be omitted.

<Second Multi-Cropping Mode>

The second multi-cropping mode according to the present exemplary embodiment will be described. In the present exemplary embodiment, the screen for the user to set the size of a transparent document folder illustrated in FIG. 15 is displayed on the operation unit 403 when the second multi-cropping mode is selected by the user, as in the second exemplary embodiment. Hereinafter, a description will be provided of a case where "A4-size Transparent Document Folder" is selected.

Figure 17A:
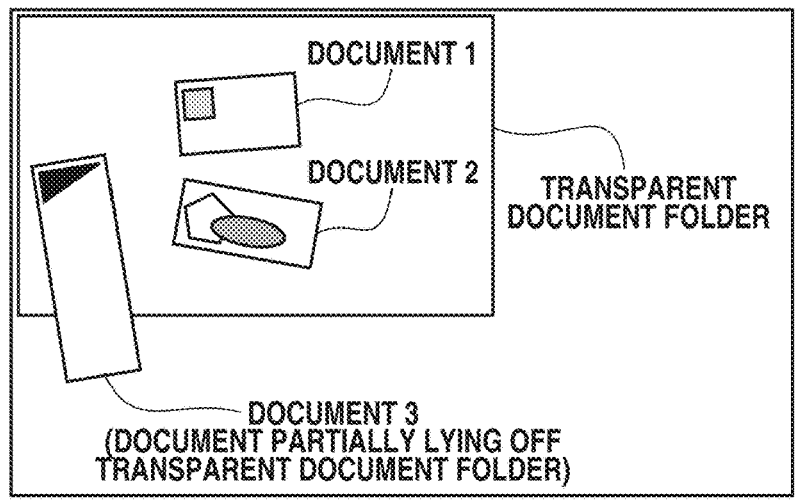
FIGS. 17A to 17C are diagrams illustrating processing for determining an edge of a document according to a fourth exemplary embodiment.
Figure 17B:
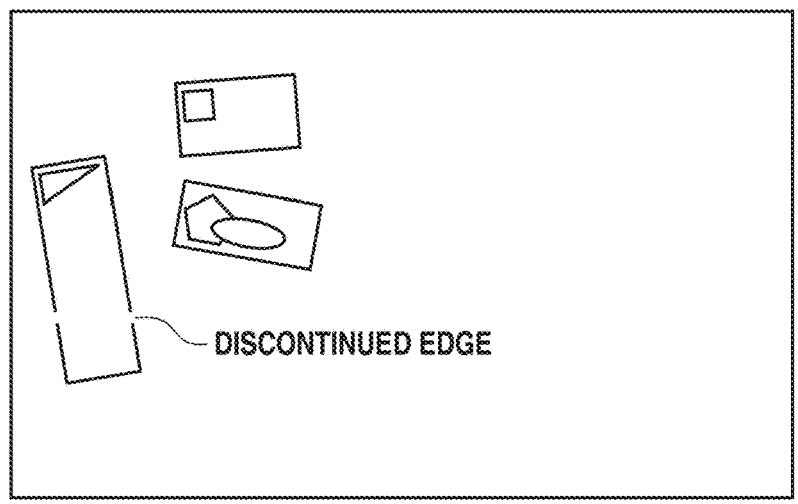
Figure 17C:
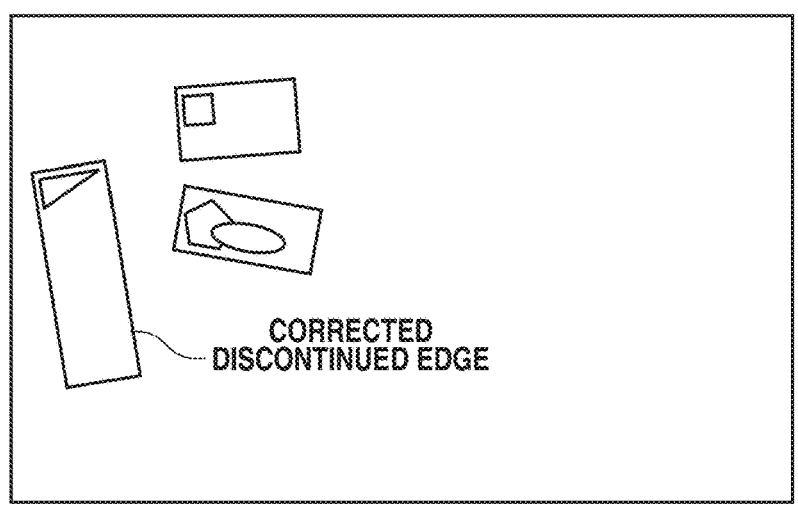
Figure 18A:
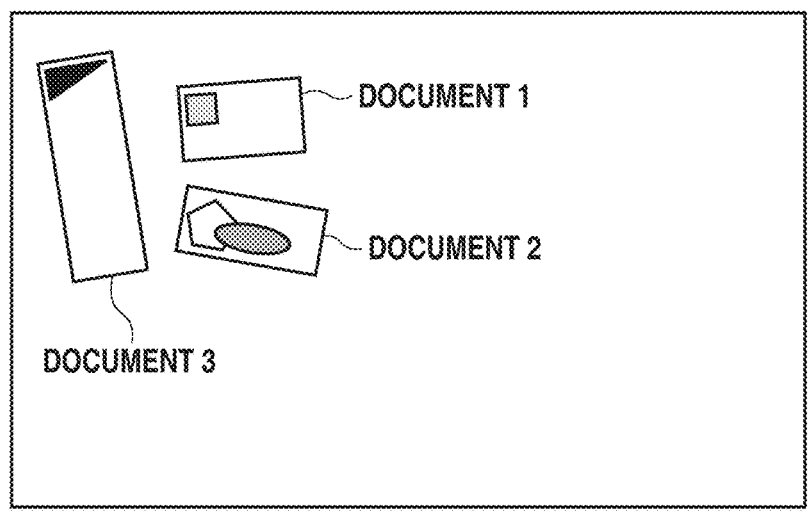
FIGS. 18A to 18D are diagrams illustrating processing for cutting out an image according to a typical technique.
Figure 18B:
Figure 18C:
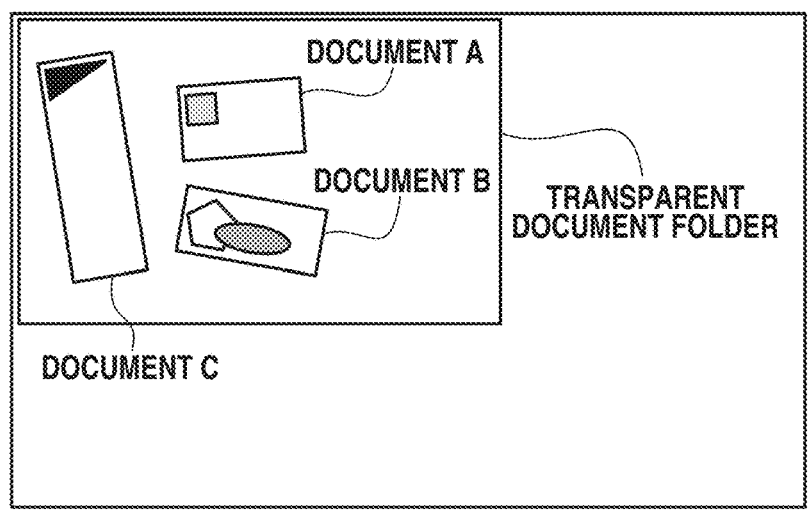
Figure 18D:
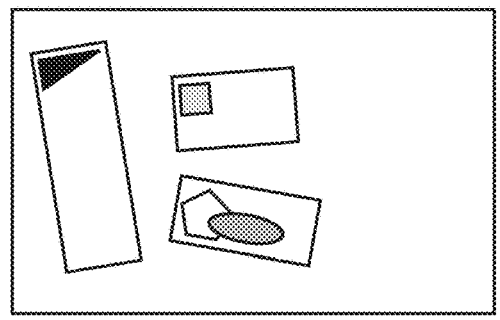

FIGS. 17A to 17C are diagrams illustrating processing for determining an edge of a document. In the present exemplary embodiment, the readable area 250 is read by the reading unit 16. FIG. 17A illustrates an image read by the reading unit 16 in a state where a transparent document folder holding documents 1, 2, and 3 is placed on the document positioning glass plate 214 with the transparent document folder abutting on the first abutting portion 223 and the second abutting portion 221. FIG. 17A illustrates a state where the document 3 partly lies off the transparent document folder.

In the second multi-cropping mode according to the present exemplary embodiment, the processing for detecting an image edge is performed on an image included in the readable area 250. Thus, edges of the documents 1 to 3, edges of images included in the documents 1 to 3, and an edge of the transparent document folder are detected as illustrated in FIG. 17A.

Thereafter, the CPU 401 masks an image corresponding to the edge of the transparent document folder having a size corresponding to the size set by the user. More specifically, the CPU 401 deletes an image (i.e., whitens the pixels) corresponding to the edge of the transparent document folder of the size set by the user, for example.

As a result, an image illustrated in FIG. 17B is generated. Specifically, the edge of the document 3 is discontinued.

The CPU 401 then interpolates the edge of the document 3 through a known method, such as the morphology transformation. Thus, an image illustrated in FIG. 17C is generated. As a result, only the edge of the transparent document folder is deleted.

Thereafter, the CPU 401 performs, on the image illustrated in FIG. 17C, detection of a document edge candidate and determination of a document edge described in the first exemplary embodiment.

The above-described configuration enables appropriate cut out of documents even if a document partly lies off the transparent document folder.

The configurations according to the first to the fourth exemplary embodiments are also applicable to a sheet (mount) on which a plurality of documents is mounted.

According to the present disclosure, it is possible to provide an image reading apparatus capable of easily cutting out individual images of documents from an image that includes the individual images of the documents.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image reading apparatus comprising:
a positioning plate having a placement surface on which a holding member that holds a plurality of documents is to be placed;
a reading unit including a light-emitting diode configured to emit light and a reading sensor configured to receive light emitted from the light-emitting diode and reflected on the holding member and the plurality of documents, configured to read an image of the holding member and the plurality of documents placed on the positioning plate;
at least one processor configured to:
cause the reading unit to read the image of the holding member and the plurality of documents placed on a reading area of the placement surface,
determine edges of the holding member from the read image;
determine an area corresponding to the holding member, having a length shorter than a length of the holding member in a main scanning direction and having a length shorter than a length of the holding member in a sub-scanning direction such that the area corresponding to the holding member excludes the determined edges of the holding member,
determine edges of the plurality of documents from the read image, the plurality of documents being within the area corresponding to the holding member,
extract a document image of each document of the plurality of documents based on the determined edges of the plurality of documents; and
generate a separate image file for each extracted document image;
wherein the at least one processor is further configured to delete the determined edges of the holding member from the read image,
wherein the deletion of the determined edges of the holding member includes deleting a portion of the determined edges of the plurality of documents from the read image, and
wherein the at least one processor is further configured to interpolate an edge corresponding to the deleted portion of the determined edges of the plurality of documents.

2. The image reading apparatus according to claim 1, wherein a size of the holding member is smaller than a size of the reading area.

3. The image reading apparatus according to claim 1, wherein the reading unit reads, via the holding member, the image of the holding member and the plurality of documents placed on the placement surface while moving the light-emitting diode in a predetermined direction,
wherein the at least one processor acquires size information corresponding to a size of the holding member, and
wherein the at least one processor controls the reading unit to move the light-emitting diode by a distance corresponding to a size of the holding member in the predetermined direction indicated by the acquired size information.

4. The image reading apparatus according to claim 1, wherein the reading unit reads the image of the holding member and the plurality of documents placed on the placement surface while moving the light-emitting diode in a first direction,
wherein the image reading apparatus further comprises:
a first abutting portion with which positioning of the holding member in the first direction is performed by one end of the holding member in the first direction being caused to abut on the first abutting portion, a second abutting portion with which positioning of the holding member in a second direction orthogonal to the first direction and parallel to the placement surface is performed by one end of the holding member in the second direction being caused to abut on the second abutting portion, and a communication unit configured to issue a notification prompting a user to make the holding member abut on the first abutting portion and the second abutting portion.

5. The image reading apparatus according to claim 1, wherein the holding member is a transparent document folder.

6. An image reading apparatus comprising:

a positioning plate having a placement surface on which a plurality of documents mounted on a mount is to be placed;

a reading unit including a light-emitting diode configured to emit light and a reading sensor configured to receive light emitted from the light-emitting diode and reflected on the mount and the plurality of documents, configured to read an image of the mount and the plurality of documents placed on the positioning plate;

at least one processor configured to:

cause the reading unit to read the image of the mount and the plurality of documents placed on a reading area of the placement surface, determine edges of the mount from the read image;

determine an area corresponding to the mount, having a length shorter than a length of the mount in a main scanning direction and having a length shorter than a length of the mount in a sub-scanning direction such that the area corresponding to the mount excludes the determined edges of the mount, determine edges of the plurality of documents from the read image, the plurality of documents being within the area corresponding to the mount, extract a document image of each document of the plurality of documents based on the determined edges of the plurality of documents; and generate a separate image file for each extracted document image, wherein the at least one processor is further configured to delete the determined edges of the mount from the read image, wherein the deletion of the determined edges of the mount includes deleting a portion of the determined edges of the plurality of documents from the read image, and wherein the at least one processor is further configured to interpolate an edge corresponding to the deleted portion of the determined edges of the plurality of documents.

7. The image reading apparatus according to claim 6, wherein the reading unit reads images, each of which being an image of a different one of the plurality of documents mounted on the mount placed on the placement surface, while moving the light-emitting diode in a predetermined direction, wherein the at least one processor acquires size information corresponding to a size of the mount, and wherein the at least one processor controls the reading unit to move the light-emitting diode by a distance corresponding to a size of the mount in the predetermined direction indicated by the acquired size information.

8. The image reading apparatus according to claim 6, wherein the reading unit reads images, each of which being an image of a different one of the plurality of documents mounted on the mount placed on the placement surface, while moving the light-emitting diode in a first direction, wherein the image reading apparatus further comprises:

a first abutting portion with which positioning of the mount in the first direction is performed by one end of the mount in the first direction being caused to abut on the first abutting portion, a second abutting portion with which positioning of the mount in a second direction orthogonal to the first direction and parallel to the placement surface is performed by one end of the mount in the second direction being caused to abut on the second abutting portion, and a communication unit configured to issue a notification prompting a user to make the mount abut on the first abutting portion and the second abutting portion.

9. The image reading apparatus according to claim 1, wherein an area surrounded by the determined edges of the holding member is determined as the area corresponding to the holding member.

10. The image reading apparatus according to claim 6, wherein area surrounded by the determined edges of the mount is determined as the area corresponding to a holding member.

\* \* \* \* \*